US012738014B2

(12) United States Patent
Dwivedi

(10) Patent No.: US 12,738,014 B2
(45) Date of Patent: Sep. 15, 2026

(54) DIRECTED INFERENCING USING INPUT DATA TRANSFORMATIONS

(71) Applicant: NVIDIA Corporation, Santa Clara, CA (US)

(72) Inventor: Shekhar Dwivedi, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 669 days.

(21) Appl. No.: 17/990,508

(22) Filed: Nov. 18, 2022

(65) Prior Publication Data

US 2024/0169686 A1 May 23, 2024

(51) Int. Cl.
*G06V 10/26* (2022.01)
*G06T 1/20* (2006.01)
*G06V 10/774* (2022.01)

(52) U.S. Cl.
CPC .............. *G06V 10/267* (2022.01); *G06T 1/20* (2013.01); *G06V 10/774* (2022.01)

(58) Field of Classification Search
CPC .... G06V 10/267; G06V 10/774; G06V 10/25; G06V 10/764; G06V 10/82; G06T 1/20
See application file for complete search history.

(56) References Cited

U.S. PATENT DOCUMENTS 10,192,327 B1 * 1/2019 Toderici ................. G06V 10/82
10,984,560 B1 * 4/2021 Appalaraju ............ G06V 10/82
11,335,077 B1 * 5/2022 Salmani Rahimi ..... G06T 19/20
12,260,598 B2 * 3/2025 Hurwitz ................... G06N 3/04
2009/0109133 A1 * 4/2009 Park ..................... G09G 3/3618 345/55
2019/0158813 A1 * 5/2019 Rowell ................ H04N 13/111
2020/0320416 A1 * 10/2020 Gillian ................... G06N 20/20
2021/0090247 A1 * 3/2021 Jeon ....................... G06N 3/047
2021/0208236 A1 * 7/2021 John Wilson .......... G07C 5/008
2021/0295570 A1 * 9/2021 Broyelle ................ G06N 3/084
2022/0021887 A1 * 1/2022 Banerjee .............. H04N 19/115
2022/0374156 A1 * 11/2022 Naruko ................. G06F 3/0608
2024/0077455 A1 * 3/2024 Lamarre ............. G01S 7/52026
2024/0233414 A1 * 7/2024 Schaumberg ........ G06V 10/454

FOREIGN PATENT DOCUMENTS

AU 6174199 A * 6/2000
CN 107679250 A * 2/2018 ........... G06F 16/583
CN 107832835 A * 3/2018 ............. G06N 3/045
CN 112738533 A * 4/2021 ......... G06F 18/2414

OTHER PUBLICATIONS

"Morozkin et al., An Image Compression for Embedded Eye-Tracking Applications, 2016 International Symposium on INnovations in Intelligent Systems and Applications (INISTA), pp. 1-5" (Year: 2016).*

Fahrni G. Three-Dimensional Adaptive Image Compression Concept for Medical Imaging: Application to Computed Tomography Angiography for Peripheral Arteries. J Cardiovasc Dev Dis. Apr. 27, 2022;9(5):137. (Year: 2022).*

* cited by examiner

*Primary Examiner* — Ming Y Hon
*Assistant Examiner* — Dominique James
(74) *Attorney, Agent, or Firm* — Lowenstein Sandler LLP

(57) ABSTRACT

Apparatuses, systems, and techniques to segment a region of interest in an input data for a machine learning model by obtaining a plurality of progressively compressed representations of the input data and processing at least two of the compressed representations to obtain matching locations of a region of interest of the input data.

20 Claims, 12 Drawing Sheets

DIRECTED INFERENCING USING INPUT DATA TRANSFORMATIONS

TECHNICAL FIELD

At least one embodiment pertains to processing resources used to execute and facilitate artificial intelligence (AI) applications. For example, at least one embodiment pertains to operations encountered during execution of AI models that process large input data sets, according to various novel techniques described herein.

BACKGROUND

AI, including machine learning, is often applied to processing of large input data sets, such as identification of objects depicted within two-dimensional or three-dimensional images. Object identification is used in medical imaging, science research, autonomous driving systems, robotic automation, security applications, law enforcement practices, and many other settings. Machine learning involves training a computing system—using training images and other training data—to identify patterns in images and to use learned patterns for object identification in new images. Training can be supervised or unsupervised. Machine learning models can use various computational algorithms, such as decision tree algorithms (or other rule-based algorithms), artificial neural networks, and the like. During the inference stage, a new image is input into a trained machine learning model and various target objects of interest (e.g., body organs in a medical image or vehicles in an image of a roadway) can be detected and classified using patterns and features identified during training.

DETAILED DESCRIPTION

Figure 1:
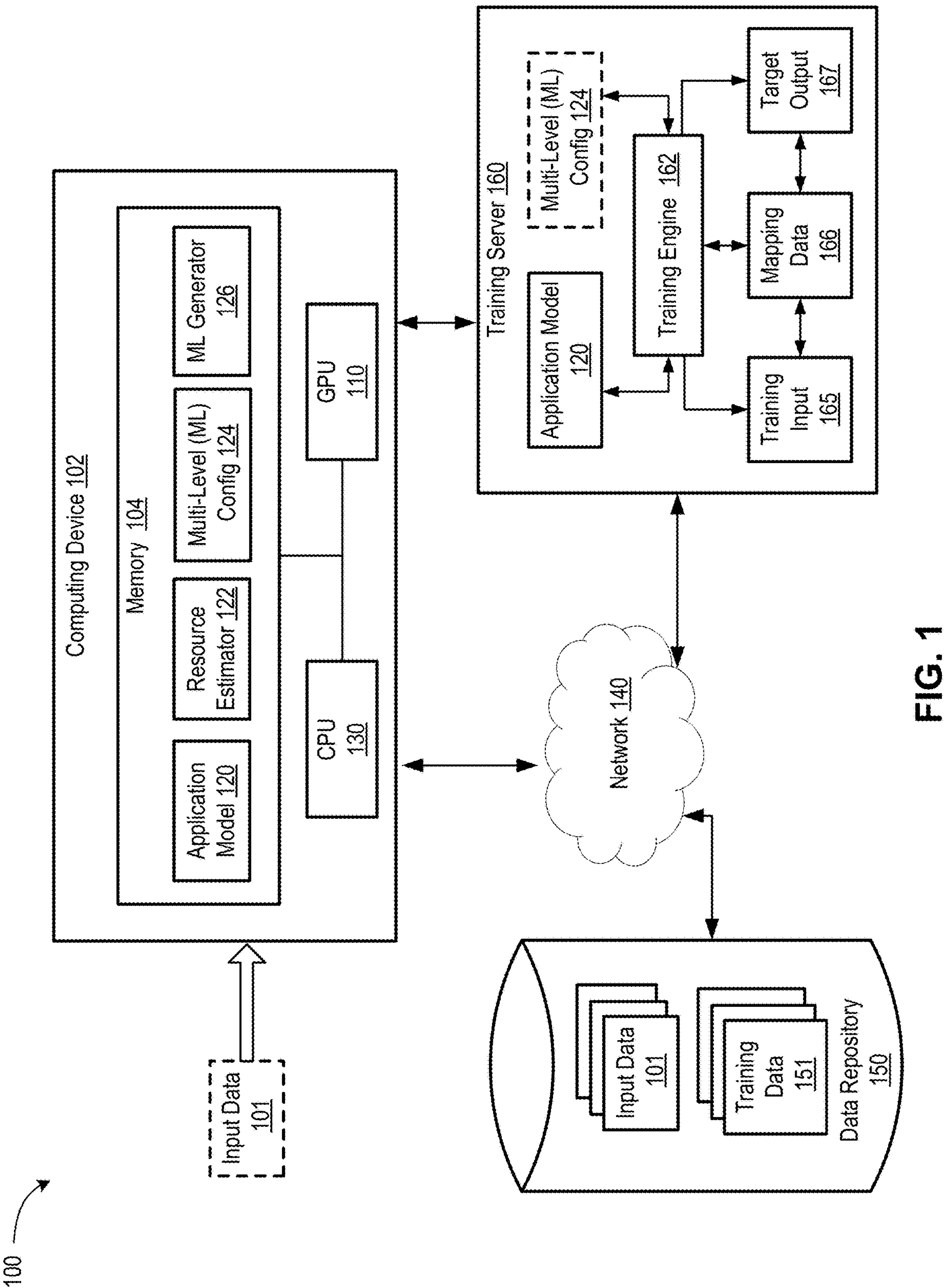
FIG. 1 is a block diagram of an example computer system that uses multiple compression levels of input data for targeted AI processing, in accordance with at least some embodiments.

Automated object recognition and classification is used in numerous technologies and industries, including but not limited to medical imaging, autonomous driving/parking systems, autonomous robot/machine operation, face recognition, manufacturing quality control, alphanumeric character recognition, robotic technologies, and many other applications. In one example, automated organ recognition and diagnostics may involve medical images obtained using computer tomography (CT), magnetic resonance imaging (MRI), positron emission tomography (PET), single-photon emission computed tomography (SPECT), ultrasound imaging, and/or some combination thereof. Modern imaging techniques often produce large multi-organ images of the body of a patient. A trained machine-learning model (MLM) may process such large images to identify depictions of particular organs, e.g., liver, heart, lungs, etc., and to diagnose various organ abnormalities, or indicia of conditions or diseases that may be present. In some instances, an organ of interest (e.g., liver) may occupy only a small portion of the large image. Processing the entire image to identify a location and characteristics of one (or a few) target organ(s) is inefficient and leads to a waste of computational resources, memory overutilization, and an overall slowdown of the diagnostic processing. Existing techniques attempting to overcome such inefficiencies include training one or more additional MLMs to perform initial segmentation of the large image into one or more regions of interest (ROIs). The need to train additional models increases the costs and complexity of the medical diagnostics and of various other pertinent applications, e.g., navigation applications, industrial applications, safety applications, and the like.

Aspects and embodiments of the present disclosure address these and other challenges of the existing technology by providing for methods and systems that enable fast and computationally efficient target identification based on the existing models without the need to train and maintain separate segmentation models. In at least one embodiment, a set of compressed representations (also referred to as levels herein) of the input data may be generated, each additional level having higher compression (lower resolution). For example, if the input data (level $L_0$) has n×m pixels (e.g., in the instance of a two-dimensional image), level $L_1$ may have (n/2)×(m/2) pixels, level $L_2$ may have (n/4)×(m/4) pixels, and so on, with level $L_N$ having $(n/2^N)\times(m/2^N)$ pixels. The number N of levels of compression may be selected by a multi-level (ML) generator based on available computational resources, e.g., processing power (clocks-per-cycle), memory, and the like, size of the input data size (e.g., total number of pixels), complexity of the model to be applied to the input data, and so on. Two or more of the compressed levels of the input data may be processed using the original model, e.g., starting with the highest compression level $L_N$, which requires the least amount of processing and memory resources, and continuing with the processing of compression levels $L_{N-1}$, $L_{N-2}$, etc. During processing of each compression level, the model may identify a location of the ROI, e.g., as location and dimensions of a bounding box enclosing the depiction of the ROI (e.g., liver) within the corresponding compression level. Additionally, the ML generator may further determine a target number M of levels (with M≤N) that need to consistently identify the same ROI for successful ROI validation. More specifically, when M compression levels (which may be any M levels or M consecutive levels, depending on the consistency criteria being used) have identified the same bounding box within a target tolerance, further compression level processing may be stopped. The consistently validated bounding box may then be used to crop the level $L_0$ input data, and the cropped portion containing the ROI in the uncompressed representation may be processed by the original model to perform any suitable object identification and classification, as may be enabled by the model. As a result, identifying the target object and determining characteristics of the target object takes significantly less time compared with the standard processing of the whole level $L_0$ input data even at the cost of additional processing of the compressed levels (since compressed level processing is a much faster operation). In those instances where a consistency check fails for the first M compression levels, the validation procedure may be continued using additional compression levels of increased resolution until M (consecutive or overall) compression levels identify the same ROI. In those instances where fewer than M (consecutive or overall) compression levels consistently identify the same ROI after all N compression levels have been processed, the full uncropped level $L_0$ input data may be processed by the model.

The advantages of the disclosed techniques include but are not limited to faster and more computationally efficient application of AI models on most platforms, including those that deploy graphics processing units (GPUs). Since significant processing resources and memory resources are saved by compressed level inferencing, the freed resources may be used for execution of other tasks, including applying other AI models (e.g., models trained to identify and classify other ROIs) to the same or different input data. Although throughout this disclosure various concepts are illustrated using medical imaging examples, substantially the same or similar concepts may be used for object recognition in various other contexts, such as object identification in driving or industrial environments, object recognition in security applications, in scientific and investigative research, as well as in many other applications. Furthermore, substantially similar techniques may be used for AI processing of any other (e.g., non-image) input data, such as identifying and processing a localized sound feature in a stream of sound data, or any other one-dimensional or multi-dimensional feature in a suitable data set, e.g., a feature in a multi-dimensional industrial quality control data.

System Architecture

FIG. 1 is a block diagram of an example computer system 100 that uses multiple compression levels of input data for targeted AI processing, in accordance with at least some embodiments. As depicted in FIG. 1, a computing system 100 may include a computing device 102, a data repository 150, and a training server 160 connected to a network 140. Network 140 may be a public network (e.g., the Internet), a private network (e.g., a local area network (LAN), or wide area network (WAN)), a wireless network, a personal area network (PAN), or a combination thereof.

Computing device 102 may be a desktop computer, a laptop computer, a smartphone, a tablet computer, a server, or any suitable computing device capable of performing the techniques described herein. Computing device 102 may be configured to receive input data 101. Input data 101 may be generated by one or more devices connected to computing device 102. For example, devices capable of generating input data 101 may be medical imaging devices (e.g., CT, Mill, PET, SPECT, etc., scanners), autonomous vehicle sensing devices (e.g., lidars, radars, long- and mid-range cameras), video recorders, photographic equipment, scanners, video, and the like. Input data 101 may be a medical image, an image of an automotive environment, an image of a person or a group of people, an image of a natural or artificial (e.g., outdoor or indoor) scenery, an image of a text or any other collection of alphanumeric characters, or any other type of image. Input data 101 may be in any digital (e.g., pixel-based or vector-based) format, including but not limited to JPEG, GIF, PNG, BMP, TIFF, CIB, DIMAP, NITF, and so on. In some embodiments, input data 101 may be non-image data, e.g., sound/voice/speech data, an industrial monitoring data set, e.g., logs of various environmental and technological conditions, which may be collectively representative of an occurrence (or non-occurrence) of an event, or may be any other input data suitable for AI processing. Input data 101 may be stored (e.g., together with other data, e.g., metadata) in data repository 150. Additionally, data repository 150 may store training data 151 for training one or more MLMs capable of data processing, according to some embodiments disclosed herein. Data repository 150 may be accessed by computing device 102 directly or (as shown in FIG. 1A) via network 140.

Data repository 150 may be a persistent storage capable of storing images as well as metadata for the stored images. Data repository 150 may be hosted by one or more storage devices, such as main memory, magnetic or optical storage based disks, tapes or hard drives, NAS, SAN, and so forth. Although depicted as separate from computing device 102, in at least one embodiment data repository 150 may be a part of computing device 102. In at least some embodiments, data repository 150 may be a network-attached file server, while in other embodiments data repository 150 may be some other type of persistent storage such as an object-oriented database, a relational database, and so forth, that may be hosted by a server machine or one or more different machines coupled to the computing device 102 via network 140.

Computing device 102 may include a memory 104 communicatively coupled with one or more processing devices, such as one or more graphics processing units (GPU) 110 and one or more central processing units (CPU) 130. Memory 104 may store one or more MLMs, such as one or more application models 120 trained to process input data 101. Application model 120 may be an object recognition model, a speech recognition model, a data log processing model, a motion recognition model, or any other suitable AI model. Application model 120 may be executed by GPU 110 and/or CPU 130. In some embodiments, application model 120 may use input data 101 (or a similar training data) as an input and identify one or more ROIs (e.g., liver, heart, lungs, and the like, within a medical CT image). Application model 120 may further classify the identified ROI among a plurality of classes (e.g., normal ROI, abnormal ROI, ROI types of abnormalities, etc.). Processing of input data 101 using application model 120 may be supported by a number of modules and engines that facilitate multi-level compression and focused inferencing.

More specifically, computing device 102 may deploy a resource estimator 122 that assesses available computational resources and complexity of application model 120 and determines utilization (e.g., percentages) of the available computational resources during execution of application model 120. In particular, computational resources may include available CPU cycles and/or GPU cycles (e.g., supported by one or more physical or virtual processors), a fast cache size, a system memory size, a bus interconnect bandwidth, and the like. The complexity of application model 120 may be characterized by dimensions of input data and parameters of application model 120, such as the number of neural layers, nodes, connections (edges) between the nodes, size of the floating point or fixed point values (e.g., biases, weights, etc.) used by the nodes, and the like.

Figure 3:
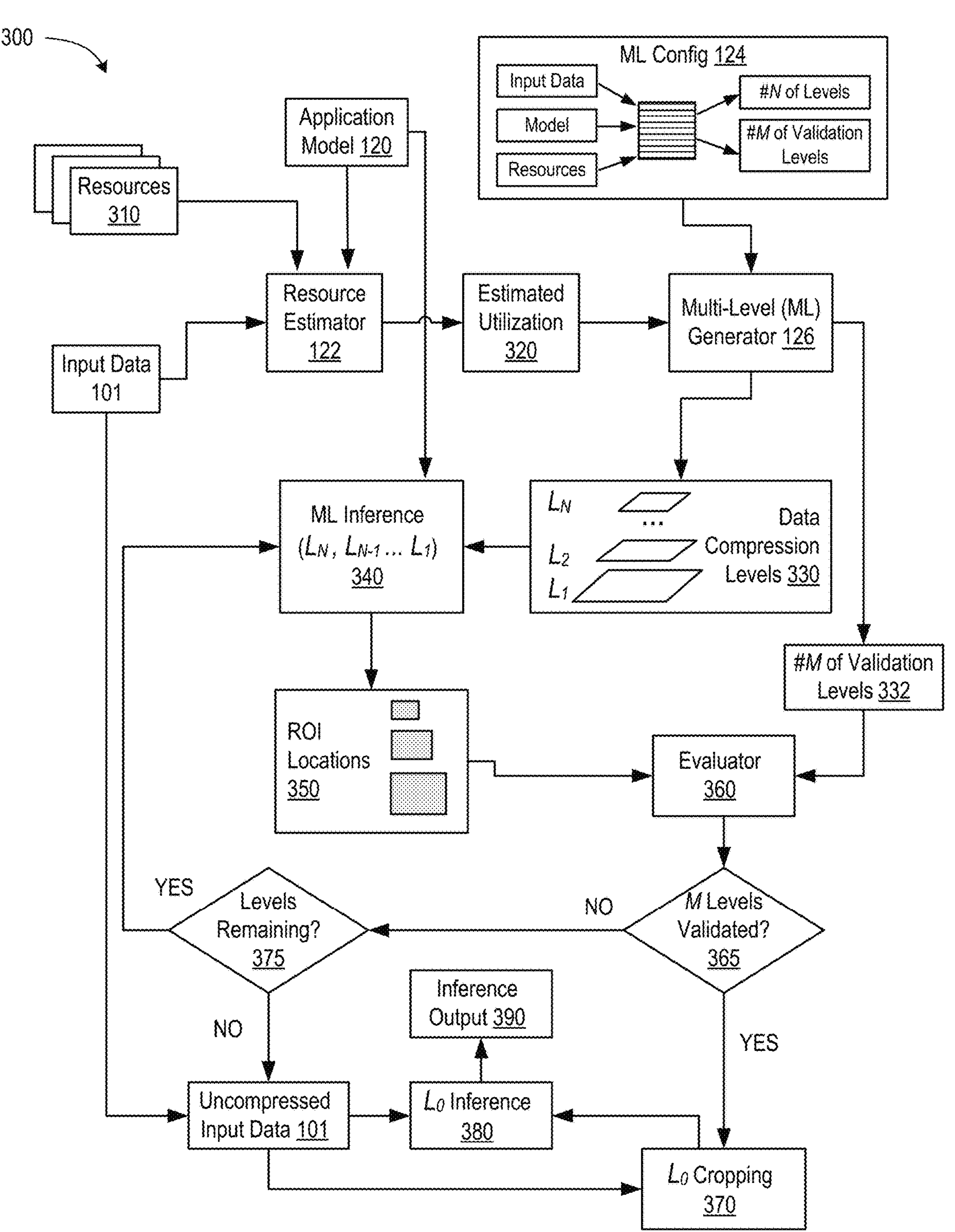
FIG. 3 illustrates example operations performed to implement focused AI processing that uses multiple compression levels of input data, according to at least one embodiment.

Computing device 102 may further deploy a multi-level (ML) configuration engine 124 that may include (or utilize) any suitable mapping data structure that maps available resources, application model 120 parameters, and/or the size of input data 101 that the application model 120 is capable of processing (and/or a portion of input data 101 that the application model 120 can process at once) to the optimal number N of compression levels to be generated for efficient processing of the input data and to the optimal number M of validation levels whose predictions are to pass ROI consistency check as described briefly above and further discussed below in conjunction with FIGS. 3-4. The mapping data structure used by ML configuration engine 124 may be a formula, a hash table/hash map, a learned MLM, or any combination thereof.

Computing device 102 may further deploy an ML generator 126 that uses an output of resource estimator 122 and the mapping data provided by ML configuration engine 124. ML generator 126 determines the target number N of compression levels and the target number M of validation levels for efficient processing of specific input data 101 given the actual resources available on (or to) computing device 102. Having determined the target numbers N and M, ML generator 126 may generate M compression levels using input data 101, e.g., by using any suitable aggregation techniques, e.g., averaging, pooling, downsampling, applying a kernel of weights, and the like. The generated compression levels may then be processed as described in more detail in conjunction with FIG. 2.

One or more application models 120 may be trained by a training server 160. In at least one embodiment, training server 160 may be a part of computing device 102. In other embodiments, training server 160 may be communicatively coupled to computing device 102 directly or via network 140. Training server 160 may be (and/or include) a rackmount server, a router computer, a personal computer, a laptop computer, a tablet computer, a desktop computer, a media center, or any combination thereof. Training server 160 may include a training engine 162. In at least one embodiment, training engine 162 may generate one or more MLMs (e.g., application models 120). The generated MLMs may be trained by training engine 162 using training data that may include training input(s) 165 and corresponding target output(s) 167. In at least one embodiment, different MLMs may be trained separately for different types of images or for different types of ROIs within the same type of images. For example, a gallbladder-specific model may be trained separately from a kidney-specific model or a heart-specific model.

For training of application model(s) 120, training input(s) 165 may include one or more sets of training data 151 and various accompanying metadata. Training data 151 may include large-scale images, such as images of an entire medical volume (e.g., a chest cavity image and/or an abdomen image), panoramic images of an automotive environment, sets of industrial monitoring logs, and the like. Large-scale images may be annotated with indications (e.g., bounding boxes or other bounding shapes such as spheroids, ellipsoids, cylindrical shapes, etc.) of the corresponding ROIs (organs in a medical image, vehicles in an automotive environment, and the like). Additionally, training engine 162 may generate mapping data 166 (e.g., metadata) that associates training input(s) 165 with correct target output(s) 167. During training of application model(s) 120, training engine 162 may identify patterns in training input(s) 165 based on desired target output(s) 167 and train application model(s) 120 to perform ROI segmentation and classification. Predictive utility of the identified patterns may be subsequently verified using additional training input/target output associations and then used, during the inference stage, by trained application model(s) 120, in future processing of input data.

In some embodiments, as indicated by the corresponding dashed box, training engine 162 may train ML configuration engine 124 to map the optimal number N of compression levels and the target number M of validation levels, for efficient processing of various training data 151 and for various available computational resources.

In at least one embodiment, each or some of application model(s) 120 and/or ML configuration engine 124 may be implemented as deep learning neural networks having multiple levels of linear or non-linear operations. For example, each or some of application model(s) 120 and/or ML configuration engine 124 may be convolutional neural networks, recurrent neural networks (RNN), fully connected neural networks, and so on. In at least one embodiment, each or some of application model(s) 120 and/or ML configuration engine 124 may include multiple neurons wherein each neuron may receive its input from other neurons or from an external source and may produce an output by applying an activation function to the sum of (trainable) weighted inputs and a bias value. In at least one embodiment, each or some of application model(s) 120 and/or ML configuration engine 124 may include multiple neurons arranged in layers, including an input layer, one or more hidden layers, and an output layer. Neurons from adjacent layers may be connected by weighted edges. Initially, edge weights may be assigned some starting (e.g., random) values. For every training input 165, training engine 162 may cause each or some of application model(s) 120 and/or ML configuration engine 124 to generate output(s). Training engine 162 may then compare observed output(s) with the desired target output(s) 167. The resulting error or mismatch, e.g., the difference between the desired target output(s) 167 and the actual output(s) of the neural networks, may be back-propagated through the respective neural networks, and the weights in the neural networks may be adjusted to make the actual outputs closer to the target outputs. This adjustment may be repeated until the output error for a given training input 165 satisfies a predetermined condition (e.g., falls below a predetermined value). Subsequently, a different training input 165 may be selected, a new output generated, and a new series of adjustments implemented, until the respective neural networks are trained to an acceptable degree of accuracy.

Figure 2:
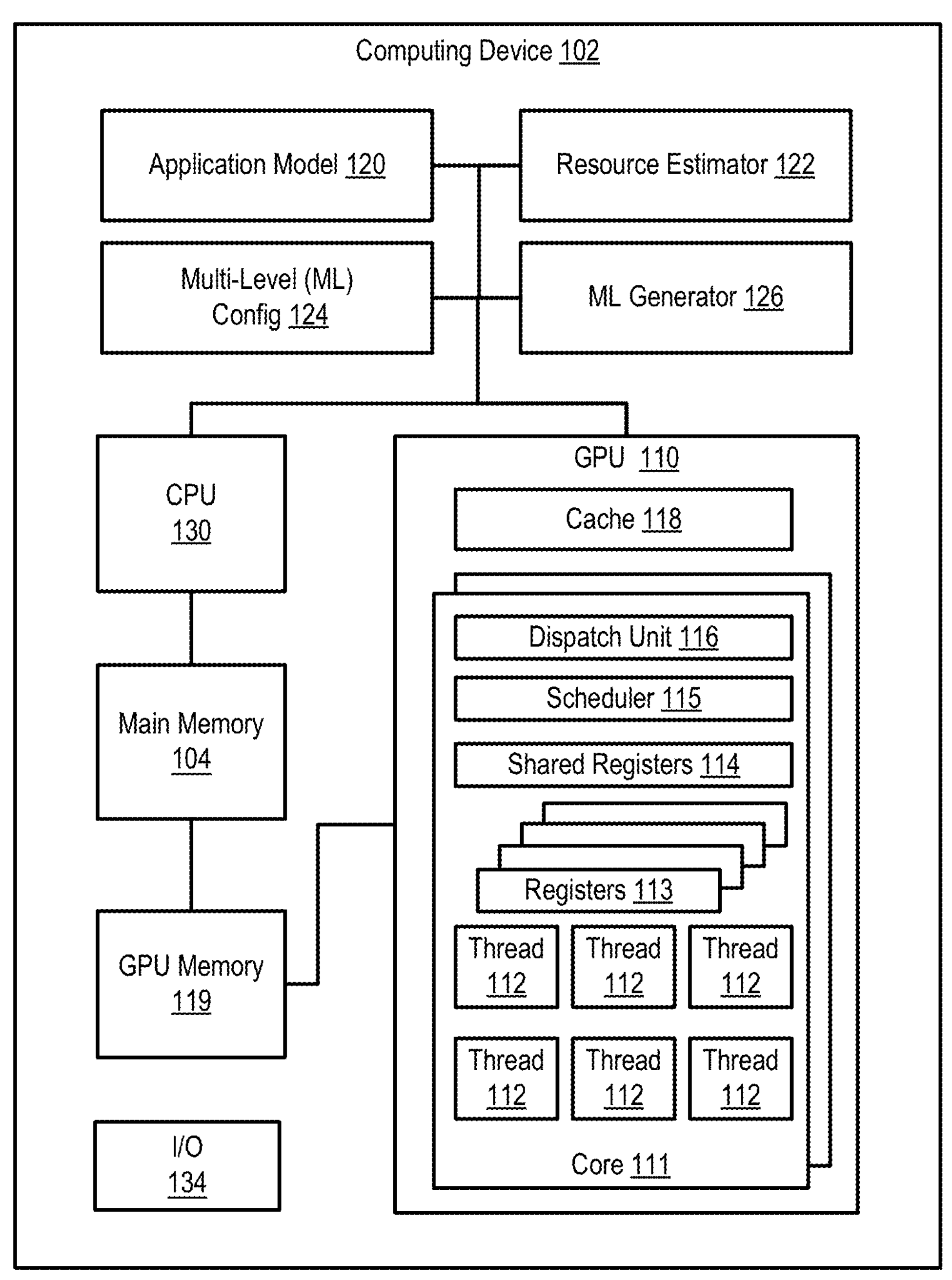
FIG. 2 illustrates an example computing device which may implement focused AI processing that uses multiple compression levels of input data, according to at least one embodiment.

FIG. 2 illustrates an example computing device 102 which may implement focused AI processing that uses multiple compression levels of input data, according to at least one embodiment. In at least one embodiment, application model 120, resource estimator 122, ML configuration engine 124, and/or ML generator 126 may be executed by one or more GPUs 110. In at least one embodiment, a GPU 110 includes multiple cores 111, each core being capable of executing multiple threads 112. Each core may run multiple threads 112 concurrently (e.g., in parallel). In at least one embodiment, threads 112 may have access to registers 113. Registers 113 may be thread-specific registers with access to a register restricted to a respective thread. Additionally, shared registers 114 may be accessed by all threads of the core. In at least one embodiment, each core 111 may include a scheduler 115 to distribute computational tasks and processes among different threads 112 of core 111. A dispatch unit 116 may implement scheduled tasks on appropriate threads using correct private registers 113 and shared registers 114. Computing device 102 may include input/output component(s) 134 to facilitate exchange of information with one or more users or developers.

In at least one embodiment, GPU 110 may have a (high-speed) cache 118, access to which may be shared by multiple cores 111. Furthermore, computing device 102 may include a GPU memory 119 where GPU 110 may store intermediate and/or final results (outputs) of various computations performed by GPU 110. After completion of a particular task, GPU 110 (or CPU 130) may move the output to (main) memory 104. In at least one embodiment, CPU 130 may execute processes that involve serial computational tasks whereas GPU 110 may execute tasks (such as multiplication of inputs of a neural node by weights and adding biases) that are amenable to parallel processing. In at least one embodiment, application model 120 may determine which processes are to be executed on GPU 110 and which processes are to be executed on CPU 130. In other embodiments, CPU 130 may determine which processes are to be executed on GPU 110 and which processes are to be executed on CPU 130.

FIG. 3 illustrates example operations 300 performed to implement focused AI processing that uses multiple compression levels of input data, according to at least one embodiment. In at least one embodiment, example operations 300 may be implemented by systems and components of computing device 102 of FIG. 1 and FIG. 2. In some embodiments, input data 101 may be a large image obtained in conjunction with a medical, industrial, automotive, or any other application. In some embodiments, input data 101 may be any non-imaging digital data, e.g., sound data, temperature data, pressure data, other sensor data, technological monitoring data, or any other suitable data that may be processed by a trained AI model, including a data that combines multiple different types of data, e.g., a combination of Mill data and CAT-scan data. As depicted in FIG. 3, input data 101 may be assessed by a resource estimator 122. Resource estimator 122 may also use, as an additional input, a description of resources 310 available for execution of processing of input data 101. Resources 310 may include CPUs, GPUs, system memory, high-speed cache, bus interconnect bandwidth, network bandwidth (e.g., when resources are distributed over a network), and so on.

In some embodiments, resource estimator 122 may use an empirically established formula and/or a hash map/table that estimates utilization of various resources when input data of a given size and type is processed by a specific model (e.g., application model 120 or any other model). For example, a resource utilization map stored as part of resource estimator 122 may be indexed by type of the data (e.g., image, data logs, speech, etc.), size of the data (e.g., number of pixels, number of channels, etc.), type of the model (e.g., a convolutional neural network, a Boltzmann machine, a long short-term memory network, etc.), size of the model (e.g., number of neuron layers, neurons, neural connections, backbones, classification heads, etc.), various other characteristics of the model (e.g., types of classifiers, types of activation functions used in various neuron layers, etc.), and/or any other information that may be pertinent to determination of a degree to which computational resources are utilized during execution of the model.

For various combinations of the input data size and parameters of the model, the utilization map may predict utilization of various computational resources during processing of the input data by the model. In some embodiments, utilization may be characterized via a set of discrete bins for specific resources, e.g., various sets of bins characterizing peak and/or mean utilization of GPUs (including virtual GPUs), CPUs (including virtual CPUs), system memory, high-speed cache, bandwidth(s), and the like. For example, a pointer (e.g., key) into the utilization table (map) may include an input image size (e.g., n×m pixels), type of model (e.g., U-net), size of the model (e.g., 24 layers of neurons, n'×m' input neurons, etc.), among other things. The value in the utilization table identified by the pointer may indicate 70%/55% peak GPU/CPU utilization, 30%/25% mean GPU/CPU utilization, 45% peak memory utilization, of a certain set of computational resources, when the input data is processed thereon. The set of computational resources may be a set of reference resources, a set of actual (current) resources of computing device 102, and so on.

Resource estimator 122 may assess resources 310, which may be actual resources of computing device 102 that are currently available for execution of the model. The currently available resources may be reduced compared with the total resources of computing device 102, as some of those resources may be occupied by other applications and programs simultaneously operating on computing device 102. Resource estimator 122 may account for these other applications and programs, e.g., by monitoring the contemporaneous utilization of the resources via a set of suitable drivers and/or application programming interfaces, and output an estimated utilization 320 of the resources that are currently available to execute application model 120.

Estimated utilization 320 may be used as an input into ML generator 126. Additional input into ML generator 126 may be provided by ML configuration engine 124. ML configuration engine 124 may include a configurable logic that maps a size of input data, parameters of a model that is to process the input data, and available computational resources to a number of data compression levels N to be generated for efficient processing of the input data. Additionally, ML configuration engine 124 may map the input data, the parameters of the model, and the available computational resources to a number of validation levels M to be used to perform a consistency check (validation) of the determined locations of ROIs. For example, if the model uses a certain percentage $P_1$ of available computational resources, ML configuration engine 124 may recommend that ML generator 126 create $N_1$ compressed levels and $M_1$ validation levels, and if the model uses a higher percentage $P_2$ ($P_2>P_1$) of computational resources, ML configuration engine 124 may recommend that ML generator 126 create $N_2$ compressed levels ($N_2>N_1$) and $M_2$ validation levels (where $M_2>M_1$).

The optimal number of validation levels M, mapped by ML configuration engine 124, may be based on prior empirical testing, including training of an MLM that may be deployed as part of ML configuration engine 124. Higher numbers M favor more accurate ROI determination but come at the cost of processing a larger number of compressed levels and a larger percentage of occurrences in which determined ROI is not validated and the inference has to be performed on the full input data 101. Accordingly, the number of validation levels M mapped by ML configuration engine 124 may be a result of an optimization procedure in which the desired accuracy of ROI determination is balanced against increased computational costs of multiple level processing. A person skilled in this technology will recognize that practically unlimited techniques of implementing such an empirical-based optimization may exist in which optimization criteria depend on end-user preferences.

The following table illustrates one example mapping of peak computational resources to the number N of compressed levels and the number M of validation levels for one specific image-processing model and input data size.

| Peak compute/memory resources P | Number of compression levels N | Number of validation levels M |
|---|---|---|
| P ≥ 70% | 12 | 5 |
| 70% > P ≥ 50% | 8 | 4 |
| 50% > P ≥ 30% | 6 | 3 |
| 30% > P ≥ 10% | 4 | 3 |
| 10% > P | 3 | 2 |

Based on the mappings provided by ML configuration engine 124 and further based on the estimated utilization 320 output by resource estimator 122, ML generator 126 may determine the target number N of compressed levels that optimize execution of application model 120 on the available resources 310. ML generator 126 may then generate, using input data 101 (also denoted equivalently as uncompressed level $L_0$ herein), data compression levels 330 $L_1, L_1 \ldots L_N$ of progressively increased compression. In one example, n×m pixels of a two-dimensional image may be aggregated into (n/2)×(m/2) pixels of level $L_1$, which may be further aggregated into (n/4)×(m/4) pixels of level $L_2$, and so on, with $(n/2^{N-1})\times(m/2^{N-1})$ pixels of level $L_{N-1}$ aggregated into $(n/2^N)\times(m/2^N)$ pixels of $L_N$. At each new level of aggregation $L_K$, pixel (j, k) may be obtained by aggregating pixels (2j, 2k), (2j+1, 2k), (2j, 2k+1), and (2j+1, 2k+1) of the previous level $L_{K-1}$.

In some embodiments, the pixel intensity of each pixel of $L_K$ may be determined using larger groups of pixels, e.g., by applying a kernel of weights (or a kernel of any other suitable size) to corresponding groups of pixels centered on a given pixel. As a result, pixels of a lower level may be weighted differently depending on the proximity of a particular pixel to the center of the group. For example, pixels of level $L_K$ may be generated by identifying $(n/2^K)\times(m/2^K)$ centers among the $(n/2^{K-1})\times(m/2^{K-1})$ pixels of level $L_{K-1}$ and applying a 3×3 kernel (or any other suitably sized kernel) to each group of 9 pixels (or any other group of pixels) of level $L_{K-1}$ to obtain the value (e.g., intensity) of the pixel of level $L_{K-1}$. Pixels having multiple intensities (e.g., RGB pixels or CMYK pixels) may be aggregated similarly, e.g., with each intensity aggregated independently of other intensities. In some embodiments, after pixel aggregation, a set of one or more filters (e.g., constrained directional filters, deblocking filters, loop filters, etc.) may be used to remove various aggregation artifacts.

In three-dimensional images (or higher-dimensional sets of data) aggregation may be performed along all three (or more) dimensions with each compressed pixel aggregated by averaging from eight (or more) pixels of the previous layer or by applying a suitably chosen (e.g., 3×3×3 kernel of weights). Although in the above examples, aggregation is isotropic in all directions and preserves the aspect ratio of the image across various compression levels; in some embodiments, compression may be performed differently along different dimensions.

ML generator 126 may further determine the target number M of validation levels 332 that optimize validation ROIs identified in different compression levels. ML inference 340 may use application model 120 to perform inference on data compression levels starting from the highest compression level $L_N$ (the lowest resolution), which takes the least amount of time to process. The output of ML inference 340 may be a bounding box or some other indication of a location of a ROI in the compressed level $L_N$ data (or multiple bounding boxes, if more than one ROI is detected), e.g., $ROI_N$, which may include four (eight in three dimension) pixels indicating corners of the ROI. Similarly, ROI identification may be performed for multiple (e.g., at least M highest compression levels) to identify ROI locations $ROI_N$, $ROI_{N-1} \ldots ROI_{N-M+1}$ for the respective compression levels of the input data. An evaluator 360 module may check for consistency of ROI identification. More specifically, the identified locations $ROI_N$, $ROI_{N-1} \ldots ROI_{N-M+1}$ may first be related to a common reference frame, e.g., a reference frame of the least compressed level $L_{N-M+1}$ evaluated or the reference frame of the uncompressed level $L_0$. This may be performed by rescaling each identified location $ROI_N$, $ROI_{N-1} \ldots ROI_{N-M+1}$ using a respective scaling factor. For example, if rescaling is performed to the least compressed level $L_{N-M+1}$, pixel coordinates of $ROI_N$ may be multiplied by factor $2^{M-1}$, pixel coordinates of $ROI_{N-1}$ may be multiplied by factor $2^{M-2}$, and so on, with $ROI_{N-M+1}$ not rescaled. Similarly, if rescaling is performed to the uncompressed level $L_0$, pixel coordinates of $ROI_N$ may be multiplied by factor $2^N$, pixel coordinates of $ROI_{N-1}$ may be multiplied by factor $2^{N-1}$, and so on, with $ROI_{N-M+1}$ rescaled by factor $2^{N-M+1}$ After bringing various ROIs to the common reference frame, rescaled $ROI_N$, $ROI_{N-1} \ldots ROI_{N-M+1}$ may be validated by comparisons with each other.

Figure 4A:
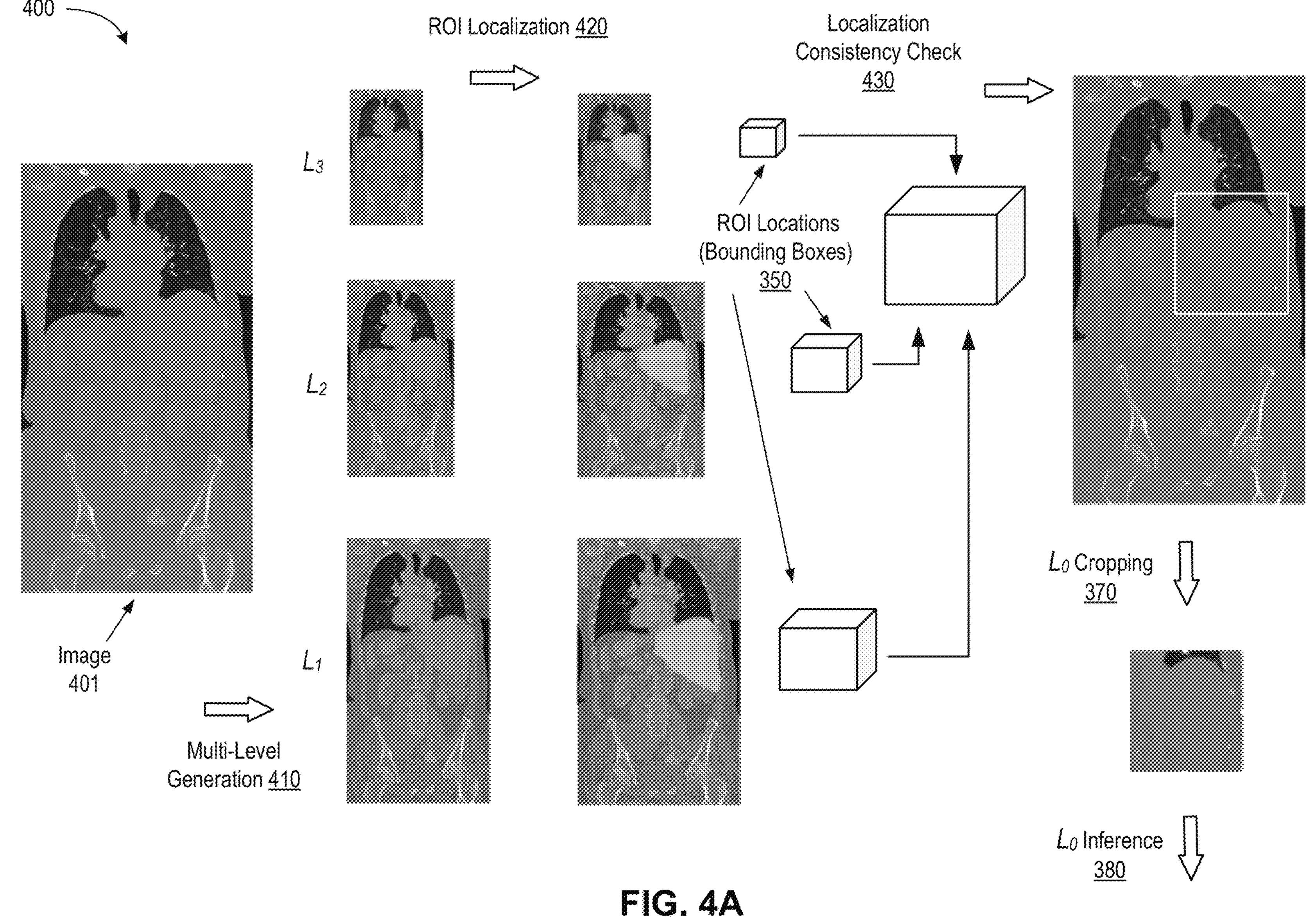
FIG. 4A illustrates schematically operations performed as part of multi-level processing using an example large multi-organ medical image, according to at least one embodiment.

FIG. 4A illustrates operations 400 performed schematically as part of multi-level processing using an example large multi-organ medical image, according to at least one embodiment. As depicted in FIG. 4A, image 401 undergoes multi-level generation 410 performed by ML generator 126 operating in conjunction with resource estimator 122 and ML configuration engine 124, as described above. ML inference is applied to at least some of the generated compression levels (three levels $L_1$, $L_2$, $L_3$ are shown for conciseness). The ML inference includes ROI localization 420 that identifies ROI locations 350, which are illustrated as rectangular bounding boxes for a specific ROI (liver, in this example). ROI locations 350 then undergo a localization consistency check 430 followed by $L_0$ cropping 370 to segment the validated ROI and further followed by $L_1$ inference 380 on the segmented ROI, as described in more detail below.

Figure 4B:
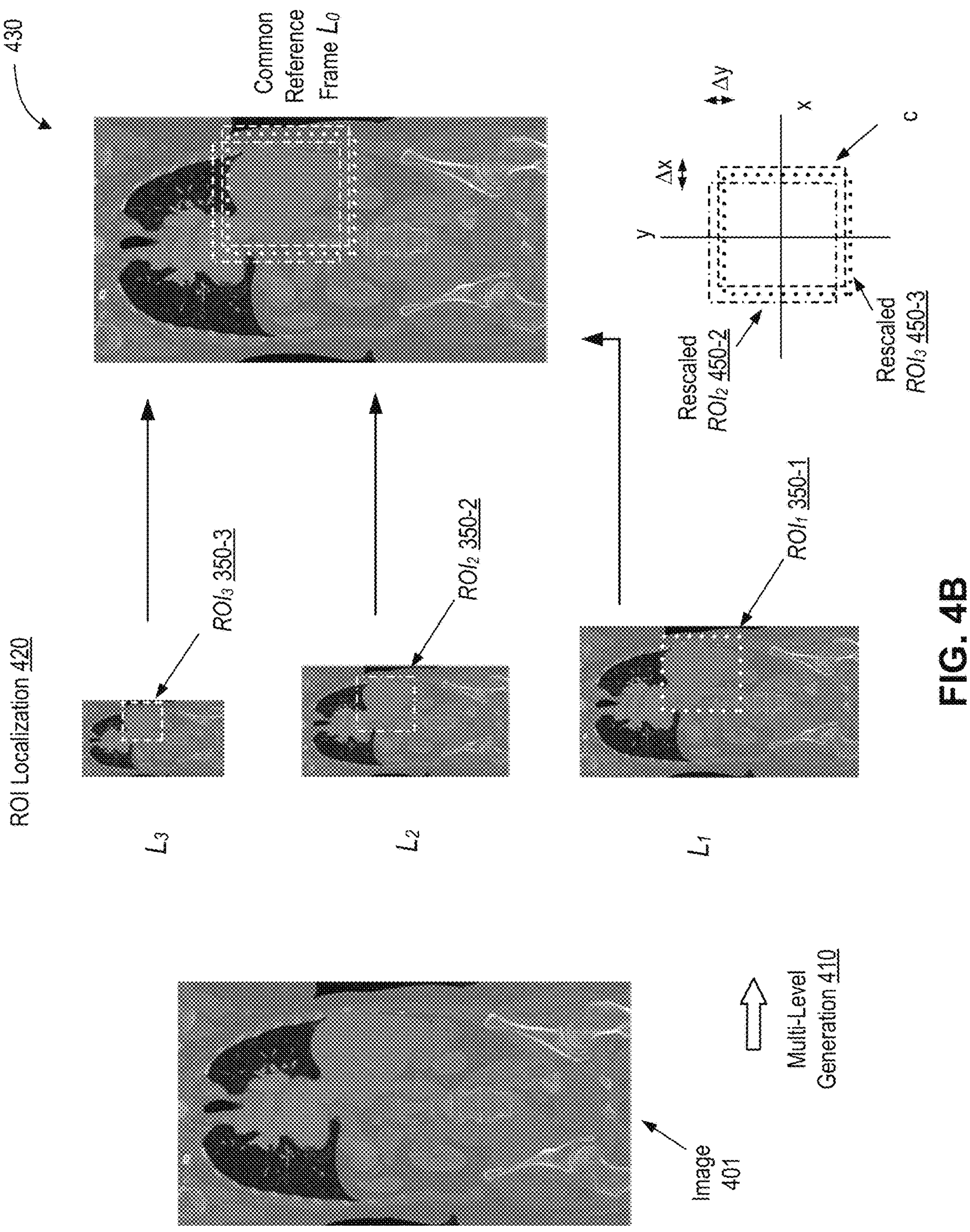
FIG. 4B illustrates schematically operations of the localization consistency check performed as part of the operations of FIG. 4A, according to at least one embodiment.

FIG. 4B illustrates schematically operations of localization consistency check 430 performed as part of operations 400 of FIG. 4A, according to at least one embodiment. Localization consistency check 430 may be performed by evaluator 360 of FIG. 3. More specifically, operations of ML inference 340 may identify obtained $ROI_1$ 350-1 using compressed level $L_1$ data, identify $ROI_2$ 350-2 using compressed level $L_2$ data, identify $ROI_3$ 350-3 using compressed level $L_3$ data, and so on. The identified ROIs may then be rescaled to the common reference frame associated with, e.g., the uncompressed level $L_0$ data (or any other suitable common reference frame). The locations of the rescaled $ROI_1$ 450-1, rescaled $ROI_2$ 450-2, rescaled $ROI_3$ 450-3, etc., may then be compared to each other. The locations may be characterized by the coordinates of the centers of the ROIs, e.g., $X_j$, $Y_j$ and width, height (depth, and so on, if applicable) $w_j$, $h_j$ of each rescaled $ROI_j$ **450-*j***. Alternatively, the locations may be identified by the coordinates of the opposite (along the diagonal) corners of the respective bounding boxes.

The mismatches $\Delta x$, $\Delta y$ of the corresponding coordinates and/or dimensions may be evaluated by evaluator 360 and compared with predetermined tolerances $l_x$, $l_y$. In some embodiments, the mismatches $\Delta x$, $\Delta y$ may be computed as the difference between some x-value (e.g., the width and/or the x-coordinate of the center) for the corresponding rescaled $ROI_j$ **450-*j* and an average of the respective x-value for the whole set of the rescaled $ROI_j$ 450-*j*. In some embodiments, each of the tolerances $l_x$, $l_y$ may be a predetermined fraction of the respective sizes of image 401 (e.g., $l_x$ may be a predetermined fraction of the width of image 401, and $l_y$ may be a predetermined fraction of the height of image 401). In some embodiments, each of the tolerances $l_x$, $l_y$ may be a predetermined fraction of the size of the ROI, which may be an average size of various rescaled $ROI_j$ 450-*j*, e.g., $l_x$ may be a predetermined fraction of the average width of various rescaled $ROI_j$ 450-*j*, and $l_y$ may be a predetermined fraction of the average height of various rescaled $ROI_j$ 450-*j*. If the mismatches for various rescaled $ROI_j$ 450-*j* are within the tolerances, $\Delta x \le l_x$, $\Delta y \le l_y$, the $ROI_j$ 450-*j* pass the consistency check 430 and are validated. If one or more of various rescaled $ROI_j$ 450-*j* are outside the tolerance (e.g., when $\Delta x > l_x$ and/or $\Delta y > l_y$) the respective rescaled $ROI_j$ 450-*j* fail the consistency check 430 and are not validated. It is possible that some ROIs of the set of $ROI_j$ 450-*j*** are validated whereas some other ROI(s) are not validated. Although the above examples illustrate validation of two-dimensional ROIs, a similar validation procedure may be performed for three-dimensional (or higher-dimensional sets of input data).

With a continuing reference to FIG. 3, evaluator 360 may evaluate the first M identified locations $ROI_N$, $ROI_{N-1}$ . . . $ROI_{N-M+1}$ and validate (block 365) M evaluated ROIs by determining that the ROIs are within the predetermined tolerances from each other, e.g., as described above in conjunction with FIG. 4B. Validation of the highest M compression (lowest resolution) levels may serve as the confirmation that identification of the ROI within input data 101 has been successful. The location of the ROI within input data 101 may now be finalized, e.g., based on one or more rescaled $ROI_j$ **450-*j*. For example, the location (e.g., the bounding box) of the final ROI may be determined as the highest resolution rescaled $ROI_{N-M}$, or as the average of the set of all M rescaled $ROI_j$ 450-*j* with $N-M \le j \le N$, or as a weighted average of the set of all M rescaled $ROI_j$ 450-*j* with higher weights given to lower values of j (higher resolution levels), or in some other suitable way. The final ROI may then be used by a level $L_0$ cropping 370 that crops the final ROI from the uncompressed input data 101 (e.g., as illustrated in FIG. 4A). Application model 120 may then be applied to the cropped ROI portion of uncompressed input data 101 for level $L_0$ inference 380. An inference output 390 may include any suitable classifications and characteristics of the cropped portion of input data 101, as may be learned during training of application model 120**.

In those instances where at least one of the first M identified locations $ROI_N$, $ROI_{N-1}$ . . . $ROI_{N-M+1}$ is not validated at block 365, example operations 300 may proceed to block 375 to determine whether any compressed levels are still remaining for which ML inference 340 has not yet been performed, such as levels $L_{N-M}$, $L_{N-M-1}$ . . . $L_1$. One or more additional levels, e.g., the highest remaining compression level, may then be processed by application model 120 as another instance of ML inference 340. ML inference 340 may identify a ROI location in the new level data and evaluator 360 may reevaluate all ROIs obtained so far, e.g., substantially as described above in conjunction with FIG. 4A and FIG. 4B. If M compression levels have been validated, example operations 300 may proceed with cropping the validated ROI by $L_0$ cropping 370 and performing level $L_0$ inference 380. In some embodiments, any M compression levels may be sufficient for ROI validation. In some embodiments, M consecutive compression levels may be needed for ROI validation. In some embodiments, M non-consecutive compression levels may be sufficient for ROI validation provided that ROIs from one, two (or more) lowest compression levels pass the consistency check.

In those instances where fewer than M compression levels have been validated (any levels or consecutive levels, depending on the validation scheme being used) and no additional compression levels are remaining, no reliable ROI determination has been achieved. If no additional compression levels remain, operations 300 may continue, at block 375, with processing the full uncompressed input data 101 using application model 120.

In some embodiments, application model 120 may perform inference on high resolution multi-dimension (HRMD) input data 101. More specifically, application model 120 may be trained to operate, at a time, on a n'×m' portion of input data 101 (which has size n×m). For example, application model 120 may have n'×m' neurons in the input layer. Correspondingly, input data 101 may be split into n'×m' portions that are processed by application model 120 sequentially. In such embodiments, ML generator 126 may generate such a number N of compression levels that the highest compression level $L_N$ has a size that is equal to (or multiple of) the size n'×m' of the input layer.

Figure 4C:
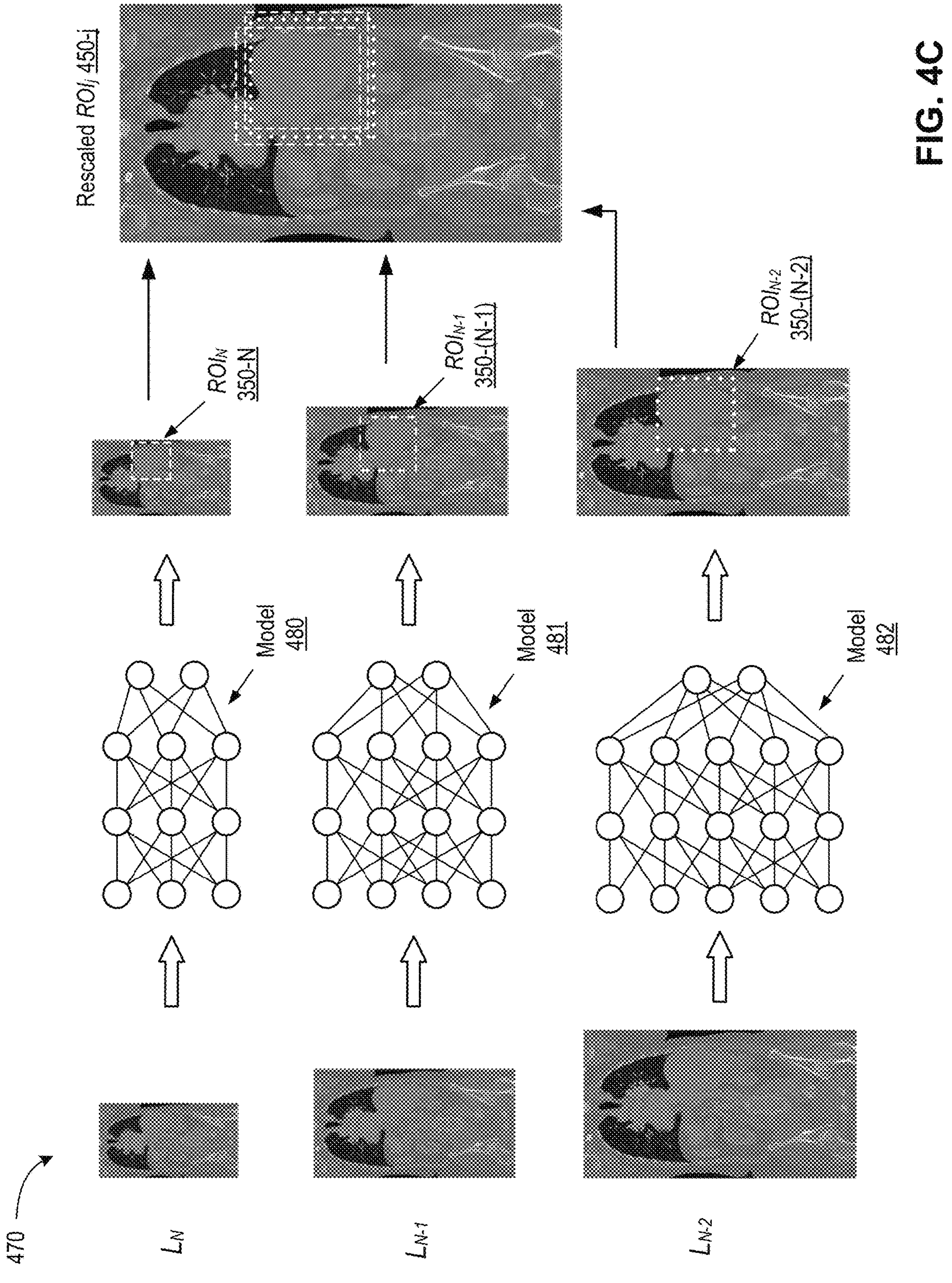
FIG. 4C illustrates schematically operations performed as part of multi-level processing using a set of compressed models, according to at least one embodiment.

In some embodiments, the number N of generated compression levels may be such that the highest compressed levels $L_N$, $L_{N-1}$, $L_{N-2}$ . . . may have sizes that are smaller than the size n'×m' of the input layer of application model 120. In some embodiments, all compressed levels may have sizes that are smaller than the size of the input layer, which may be the same as the size of input data 101. FIG. 4C illustrates schematically operations 470 performed as part of multi-level processing using a set of compressed models, according to at least one embodiment. In particular, to process compressed levels of a size that is smaller than the size of the input layer of application model 120, a set of compressed application models may be generated and trained with input sizes that match the respective sizes of compressed levels $L_j$. For example, model 480 may have the number of neurons in the input layer that matches the size of compressed level $L_N$ of data, model 481 may have the number of neurons in the input layer that matches the size of compressed level $L_{N-1}$ of data, model 482 may have the number of neurons in the input layer that matches the size of compressed level $L_{N-2}$ of data, and so on. Each model may process the respective compressed level of data and output a corresponding $ROI_j$ **350-*j*. The rescaled $ROI_j$ 450-*j* may then be obtained (e.g., as described in conjunction with FIG. 4B) and ROI validation and other operations may be performed (e.g., as described in conjunction with FIG. 3**).

Compressed models 480, 481, 482 . . . may be derived from application model 120. In some embodiments, the compressed models may be generated using random adaptive node selection techniques. More specifically, a random set of neurons (nodes) may be retrained in application model 120 to generate an instance of a particular model, e.g., model 482, of the target size. Multiple instances of model 482 may be generated and tested using corresponding compressed levels (e.g., level $L_{N-2}$) of a training data. An instance of model 482 with the highest accuracy (e.g., success rate) of correct ROI identification may then be retained. Other compressed models may be generated in a sequential adaptive fashion. For example, compressed model 481 may be obtained by generating multiple instances of model 482 with a reduced number of neural nodes and selecting the most accurate instance, and so on. In some embodiments, all compressed models may be generated directly from application model 120, rather than sequentially, from other compressed models.

Figure 5:
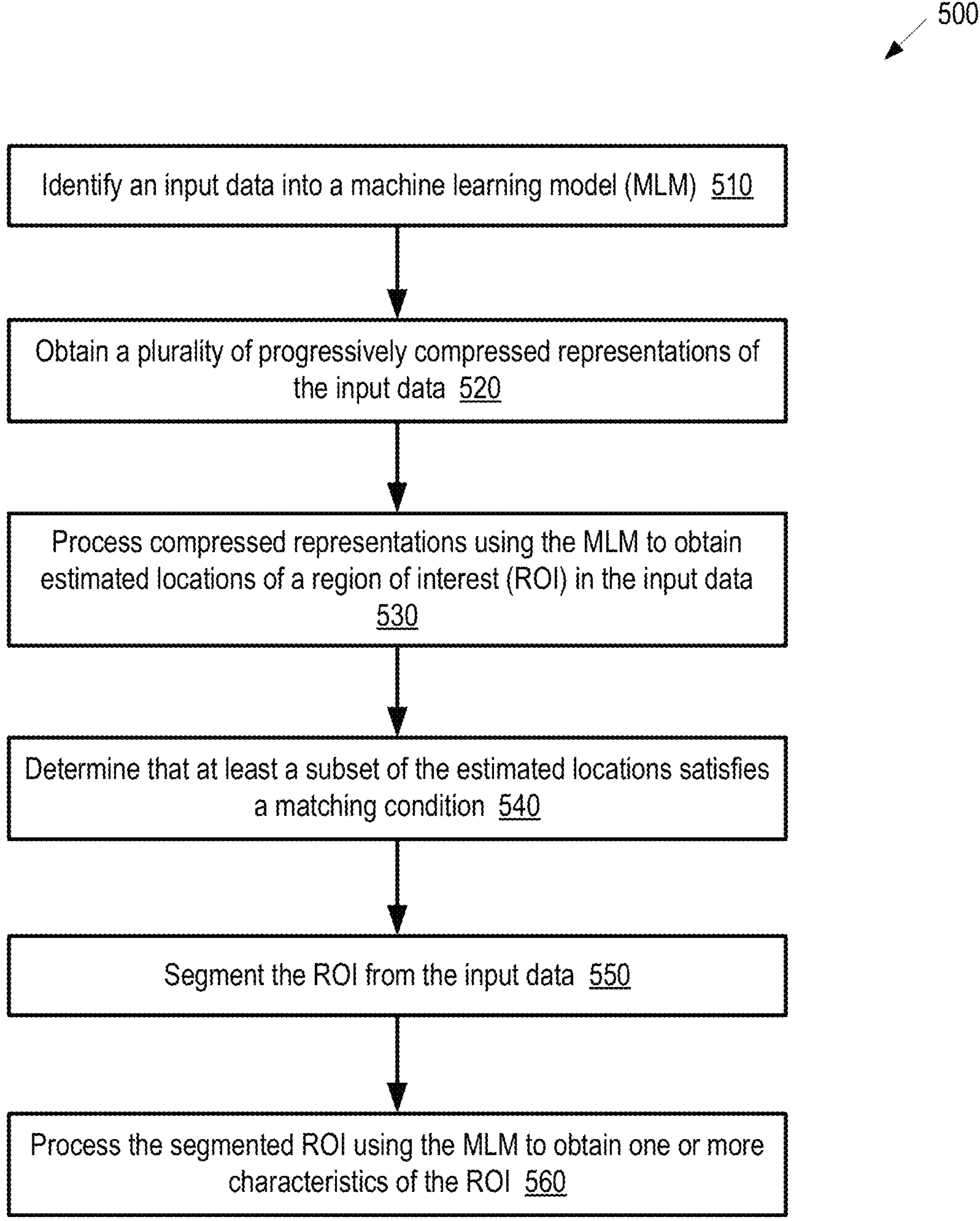
FIG. 5 is a flow diagram of an example method of focused AI processing that uses multiple transformations of input data, according to at least one embodiment.
Figure 6:
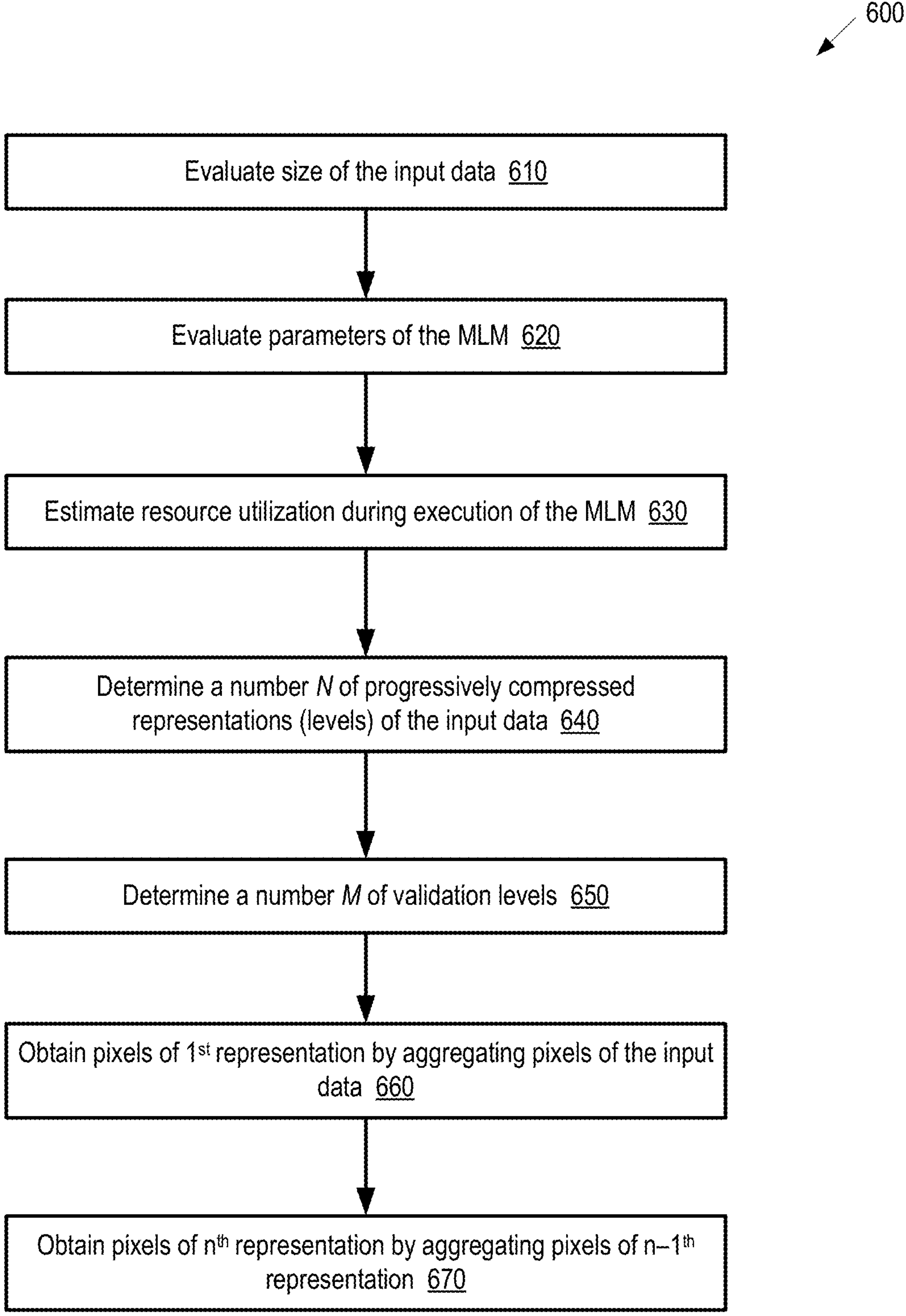
FIG. 6 is a flow diagram of an example method of determining a number of transformations for focused AI processing of input data, according to at least one embodiment.

FIG. 5 and FIG. 6 are flow diagrams of example methods 500 and 600 respectively that facilitate efficient execution of machine learning models, according to some embodiments of the present disclosure. In at least one embodiment, method 500 and method 600 may be performed by processing units of computing device 102 of FIG. 1. Processing units performing methods 500 and 600 may include one or more CPUs and/or one or more GPUs, which may communicate with one or more memory devices. In at least one embodiment, method 500 and method 600 may be performed by multiple processing threads (e.g., CPU threads and/or GPU threads), each thread executing one or more individual functions, routines, subroutines, or operations of the method. In at least one embodiment, processing threads implementing method 500 and/or method 600 may be synchronized (e.g., using semaphores, critical sections, and/or other thread synchronization mechanisms). Alternatively, processing threads implementing method 500 and/or method 600 may be executed asynchronously with respect to each other. Various operations of methods 500 and 600 may be performed in a different order compared with the order shown in FIG. 5 and FIG. 6. Some operations of the methods may be performed concurrently with other operations. In at least one embodiment, one or more operations shown in FIG. 5 and/or FIG. 6 may not always be performed.

In some embodiments, the processing units performing method 500 and/or method 600 may be included in at least one of the following: a control system for an autonomous or semi-autonomous machine; a perception system for an autonomous or semi-autonomous machine; a system for executing one or more real-time streaming applications; a system for performing simulation operations; a system for performing digital twin operations; a system for performing light transport simulation; a system for performing collaborative content creation for 3D assets; a system for performing deep learning operations; a system implemented using an edge device; a system implemented using a robot; a system for performing conversational AI operations; a system for generating synthetic data; a system incorporating one or more virtual machines (VMs); a system implemented at least partially in a data center; or a system implemented, at least partially, using cloud computing resources.

FIG. 5 is a flow diagram of an example method 500 of focused AI inference that uses multiple transformations of input data, according to at least one embodiment. Method 500 may be performed as part of an AI application that involves medical imaging, autonomous driving systems, industrial monitoring, and/or any other suitable context. In some embodiments, multiple transformations used to implement method 500 may be compression transformations. Processing units performing method 500 may identify, at block 510, an input data into a machine learning model (MLM). In some embodiments, the input data may be stored locally. In some embodiments, the input data may be received over a network connection. In some embodiments, the input data may be received from an input device, e.g., a medical imaging equipment, an autonomous vehicle sensing system, and the like. In some embodiments, the input data may include an image.

At block 520, method 500 may continue with the processing units obtaining a plurality of progressively compressed representations of the input data (e.g., data compression levels 330 in FIG. 3). At block 530, method 500 may include processing two or more of the plurality of progressively compressed representations of the input data using the MLM. The processing may be performed to estimate, for each of the two or more compressed representations, a location of a region of interest (ROI) in the input data (e.g., ROI locations RO k 350-*k* in the example illustration of FIG. 4B). In some embodiments, each of the estimated locations may include an identification of a size and position of a bounding box enclosing the ROI.

At block 540, method 500 may continue with the processing units determining that at least a subset of the estimated locations of the ROI satisfies a matching condition. For example, determining that the subset of the estimated locations of the ROI satisfies a matching condition may include determining that the estimated locations in the subset are within a predetermined tolerance of each other (e.g., as illustrated in FIG. 4B). At block 550, responsive to the estimated locations of the ROI satisfying a matching condition, the processing units performing method 500 may segment the ROI from the input data (e.g., as illustrated in FIG. 4A). At block 560, method 500 may continue with processing the segmented ROI using the MLM to obtain one or more characteristics of the ROI.

FIG. 6 is a flow diagram of an example method 600 for determining a number of transformations for focused AI processing of input data, according to at least one embodiment. In some embodiments, method 600 may be performed in conjunction with method 500. In some embodiments, processing units performing method 600 may evaluate, at block 610, the size of the input data into the MLM, e.g., a number of pixels of an image, a number of channels (e.g., colors) per pixel, and so on. At block 620, method 600 may include the processing units evaluating parameters of the MLM, e.g., a number of neuron layers of the MLM, a number of nodes in the MLM, an average number of edges (connections) per node, a type of the MLM (e.g., a convolutional neural network, a recurrent neural network, a fully-connected neural network, an encoder/decoder U-net network, a transformer network, etc.), a data format used in neural nodal operations (e.g., a floating point format, a fixed point format, an integer format, etc.), and the like.

At block 630, method 600 may include estimating (e.g., using the evaluated size of the input data and the evaluated parameters of the MLM), resource utilization during execution of the MLM on available computing resources. In some embodiments, the computing resources available for processing of the input data may include one or more GPUs, one or more CPUs, one or more memory devices (e.g., registers, system memory, high-speed cache, etc.), and so on.

At block 640, method 600 may continue with the processing units determining a first number N of progressively compressed representations (levels) of the input data. At block 650, method 600 may continue with the processing units determining a second number M of validation levels, which may be the number of matching estimated locations of the ROI that are to be obtained (using different compressed representations) for ROI validation. Determining at least one of the first number N or the second number M may be based on the size of the input data (e.g., as evaluated at block 610), parameters of the MLM (e.g., as evaluated at block 620), and estimated resource utilization (e.g., as evaluated at block 630). In some embodiments, determining at least one of the first number N or the second number M may include using a mapping table that encodes an empirical correspondence of the available computing resources and the size of the input data to at least one of the first number N or the second number M. In some embodiments, determining at least one of the first number N or the second number M may include applying a learned model to a list of the available computing resources, the size of the input data, and/or the parameters of the MLM. In such embodiments, operations of the learned model may amount to the combined operations of blocks 610-630.

At blocks 660-670, method 600 may continue with obtaining the plurality of progressively compressed representations of the input data. In particular, at block 660, the processing units performing method 600 may obtain each of a plurality of pixels of a first representation of the plurality of progressively compressed representations of the input data by aggregating one or more pixels of the input data. Similarly, at block 670, the processing units performing method 600 may obtain each of a plurality of pixels of $n^{th}$ (e.g., second, third . . . $N^{th}$) representation of the plurality of progressively compressed representations of the input data by aggregating one or more pixels of the $n-1^{th}$ (e.g., first, second . . . $N-1^{th}$) representation.

In some embodiments, multiple transformations used to implement method 500 and method 600 may be transformations that are other than compression transformations or transformations that include both compression and non-compression manipulations of the input data, such as a cropping transformation. For example, the input data may include a large image, such as a CT scan that depicts multiple organs of a patient or a wide-view (e.g., panoramic) image of a city/highway environment. A ROI may be a particular organ or a vehicle, pedestrian, bicyclist, etc. A set of heuristics may be applied to the large image to obtain a crude estimation of where the ROI is likely to be, e.g., at a certain approximate fixed location, such as where the patient's body is positioned approximately in the same consistent way relative to an imaging apparatus, or between identifiable markers, such as between the sides of the roadway, and the like. The set of heuristics may be used to crop a plurality of (e.g., N) images of the area where the ROI is expected to be located. In some embodiments, each of the plurality of images may have the same resolution as the original image but different sizes, e.g., $L_1$ image may have the largest size and $L_N$ image may have the smallest size (which may still be larger than the anticipated size of the ROI). In some embodiments, each of the plurality of cropped images may have the same size but different resolutions, e.g., $L_1$ image may have the highest resolution and L N image may have the lowest resolution. In some embodiments, each of the plurality of images may have both different sizes and different resolutions. The processing of at least M of the images $L_1$ . . . L N and the identification of the ROI may then be performed substantially as described above, e.g., based on consistency in M identified ROIs using different cropped and/or rescaled portions of the original image.

Inference and Training Logic

Figure 7A:
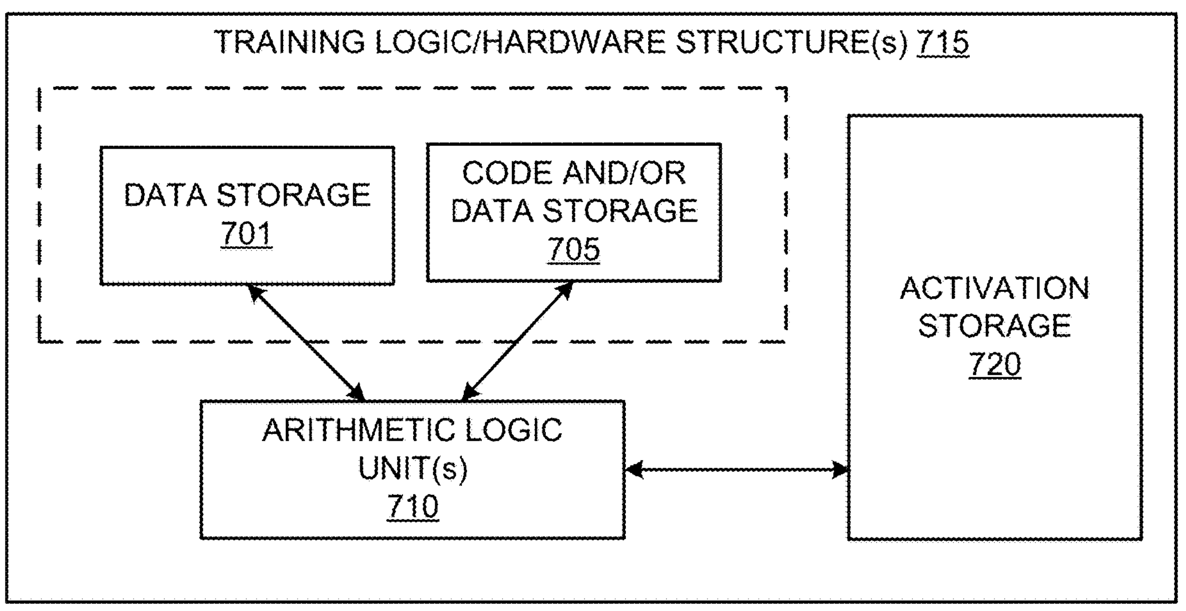
FIG. 7A illustrates inference and/or training logic, according to at least one embodiment.

FIG. 7A illustrates inference and/or training logic 715 used to perform inferencing and/or training operations associated with one or more embodiments.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs) or simply circuits). In at least one embodiment, code, such as graph code, loads weight or other parameter information into processor ALUs based on an architecture of a neural network to which such code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 701 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs).

In at least one embodiment, code, such as graph code, causes the loading of weight or other parameter information into processor ALUs based on an architecture of a neural network to which such code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to one or more processors or other hardware logic devices or circuits. In at least one embodiment, code and/or data storage 705 may be cache memory, DRAM, SRAM, non-volatile memory (e.g., flash memory), or other storage. In at least one embodiment, a choice of whether code and/or data storage 705 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be a combined storage structure. In at least one embodiment, code and/or data storage 701 and code and/or data storage 705 may be partially combined and partially separate. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALU(s) 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., flash memory), or other storage. In at least one embodiment, activation storage 720 may be completely or partially within or external to one or more processors or other logical circuits. In at least one embodiment, a choice of whether activation storage 720 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 illustrated in FIG. 7A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
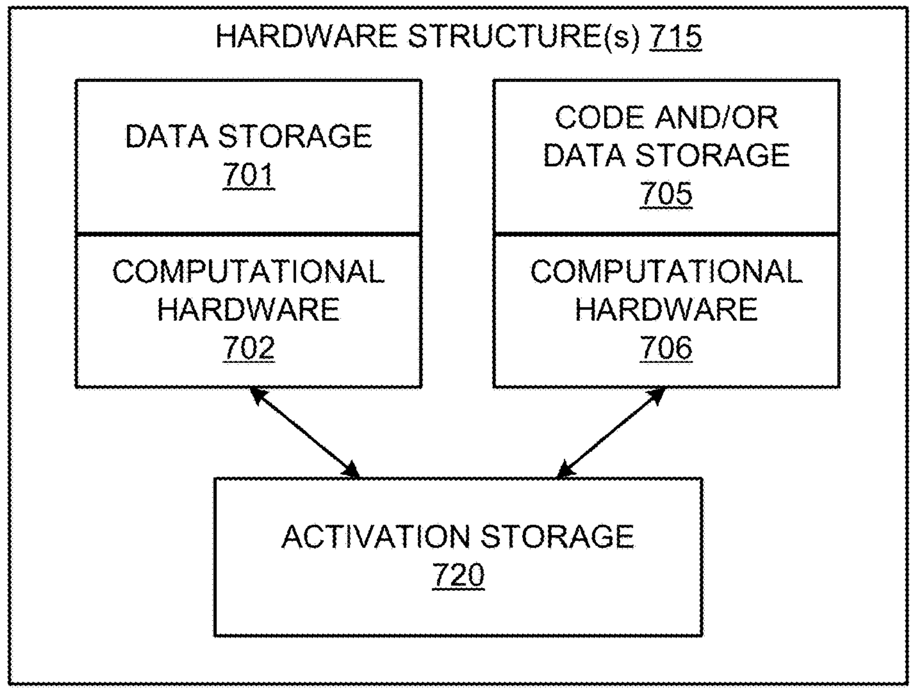
FIG. 7B illustrates inference and/or training logic, according to at least one embodiment.

FIG. 7B illustrates inference and/or training logic 715, according to at least one embodiment. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one storage/computational pair 701/702 of code and/or data storage 701 and computational hardware 702 is provided as an input to a next storage/computational pair 705/706 of code and/or data storage 705 and computational hardware 706, in order to mirror a conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage/computation pairs 701/702 and 705/706 may be included in inference and/or training logic 715.

Neural Network Training and Deployment

Figure 8:
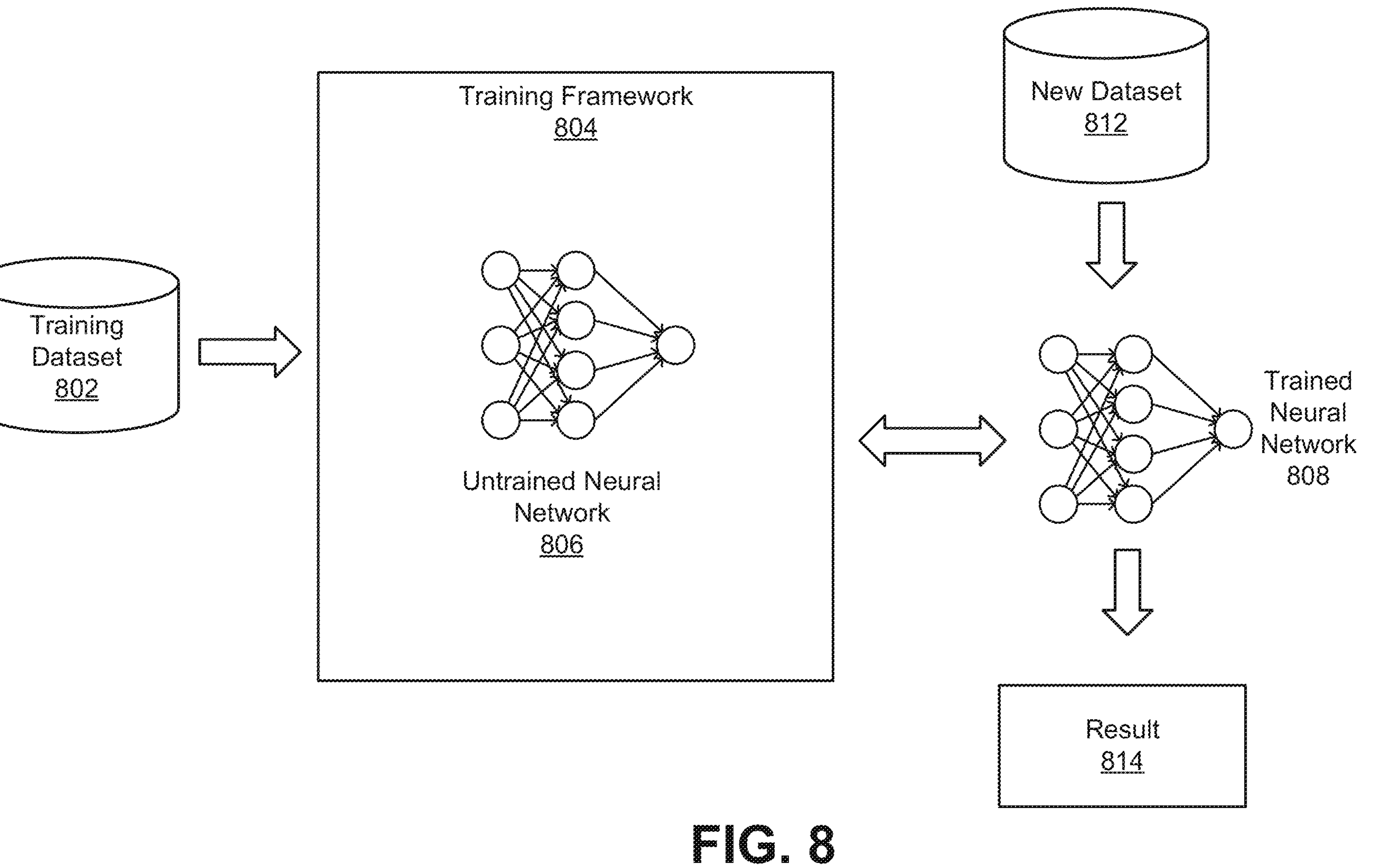
FIG. 8 illustrates training and deployment of a neural network, according to at least one embodiment.

FIG. 8 illustrates training and deployment of a deep neural network, according to at least one embodiment. In at least one embodiment, untrained neural network 806 is trained using a training dataset 802. In at least one embodiment, training framework 804 is a PyTorch framework, whereas in other embodiments, training framework 804 is a TensorFlow, Boost, Caffe, Microsoft Cognitive Toolkit/CNTK, MXNet, Chainer, Keras, Deeplearning4j, or other training framework. In at least one embodiment, training framework 804 trains an untrained neural network 806 and enables it to be trained using processing resources described herein to generate a trained neural network 808. In at least one embodiment, weights may be chosen randomly or by pre-training using a deep belief network. In at least one embodiment, training may be performed in either a supervised, partially supervised, or unsupervised manner.

In at least one embodiment, untrained neural network 806 is trained using supervised learning, wherein training dataset 802 includes an input paired with a desired output for an input, or where training dataset 802 includes input having a known output and an output of neural network 806 is manually graded. In at least one embodiment, untrained neural network 806 is trained in a supervised manner and processes inputs from training dataset 802 and compares resulting outputs against a set of expected or desired outputs. In at least one embodiment, errors are then propagated back through untrained neural network 806. In at least one embodiment, training framework 804 adjusts weights that control untrained neural network 806. In at least one embodiment, training framework 804 includes tools to monitor how well untrained neural network 806 is converging towards a model, such as trained neural network 808, suitable to generating correct answers, such as in result 814, based on input data such as a new dataset 812. In at least one embodiment, training framework 804 trains untrained neural network 806 repeatedly while adjusting weights to refine an output of untrained neural network 806 using a loss function and adjustment algorithm, such as stochastic gradient descent. In at least one embodiment, training framework 804 trains untrained neural network 806 until untrained neural network 806 achieves a desired accuracy. In at least one embodiment, trained neural network 808 may then be deployed to implement any number of machine learning operations.

In at least one embodiment, untrained neural network 806 is trained using unsupervised learning, whereas untrained neural network 806 attempts to train itself using unlabeled data. In at least one embodiment, unsupervised learning training dataset 802 will include input data without any associated output data or "ground truth" data. In at least one embodiment, untrained neural network 806 may learn groupings within training dataset 802 and may determine how individual inputs are related to untrained dataset 802. In at least one embodiment, unsupervised training may be used to generate a self-organizing map in trained neural network 808 capable of performing operations useful in reducing dimensionality of new dataset 812. In at least one embodiment, unsupervised training may also be used to perform anomaly detection, which allows identification of data points in new dataset 812 that deviate from normal patterns of new dataset 812.

In at least one embodiment, semi-supervised learning may be used, which is a technique in which in training dataset 802 includes a mix of labeled and unlabeled data. In at least one embodiment, training framework 804 may be used to perform incremental learning, such as through transferred learning techniques. In at least one embodiment, incremental learning enables trained neural network 808 to adapt to new dataset 812 without forgetting knowledge instilled within trained neural network 808 during initial training.

Figure 9:
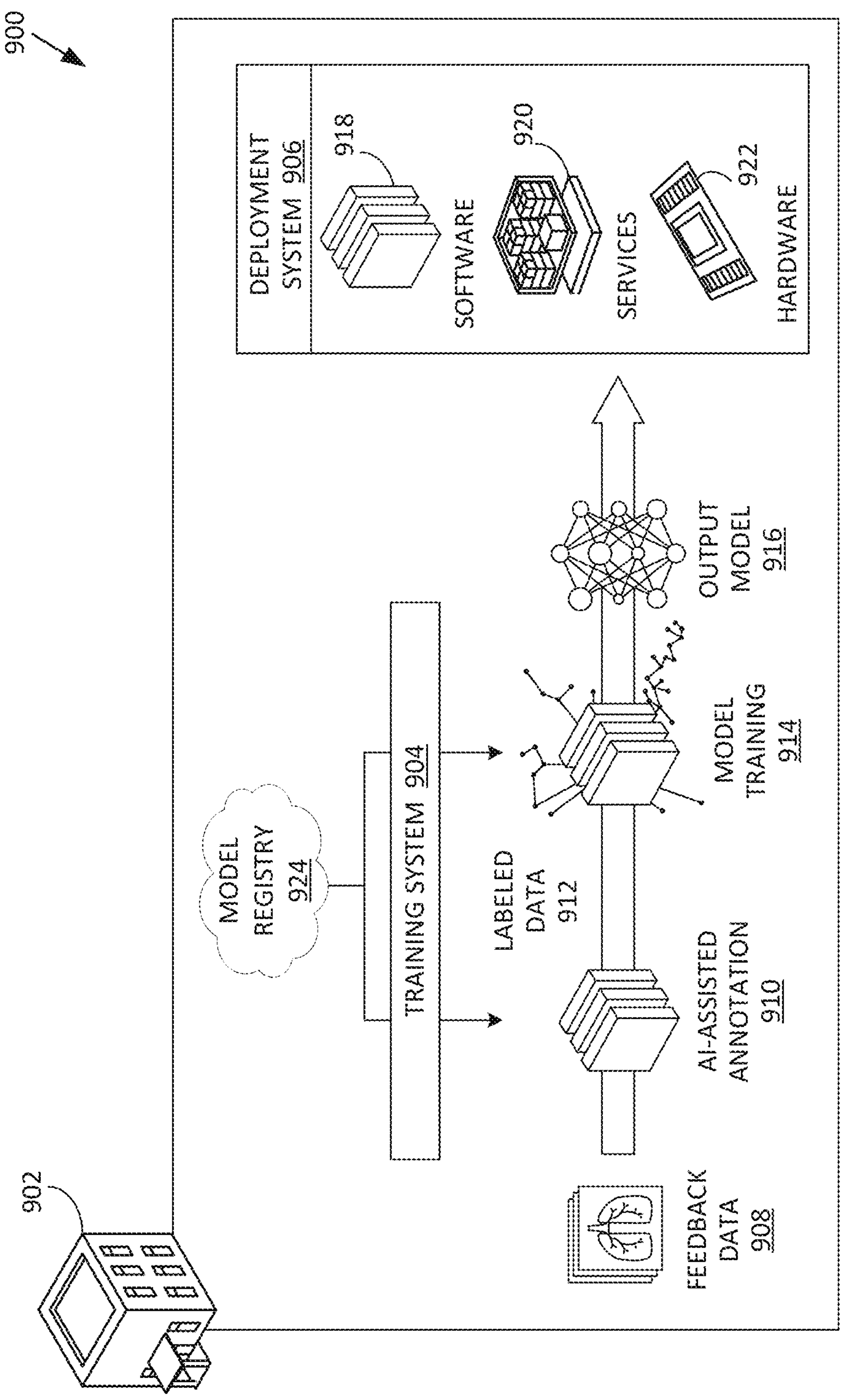
FIG. 9 is an example data flow diagram for an advanced computing pipeline, according to at least one embodiment.

With reference to FIG. 9, FIG. 9 is an example data flow diagram for a process 900 of generating and deploying a processing and inferencing pipeline, according to at least one embodiment. In at least one embodiment, process 900 may be deployed to perform game name recognition analysis and inferencing on user feedback data at one or more facilities 902, such as a data center.

In at least one embodiment, process 900 may be executed within a training system 904 and/or a deployment system 906. In at least one embodiment, training system 904 may be used to perform training, deployment, and embodiment of machine learning models (e.g., neural networks, object detection algorithms, computer vision algorithms, etc.) for use in deployment system 906. In at least one embodiment, deployment system 906 may be configured to offload processing and compute resources among a distributed computing environment to reduce infrastructure requirements at facility 902. In at least one embodiment, deployment system 906 may provide a streamlined platform for selecting, customizing, and implementing virtual instruments for use with computing devices at facility 902. In at least one embodiment, virtual instruments may include software-defined applications for performing one or more processing operations with respect to feedback data. In at least one embodiment, one or more applications in a pipeline may use or call upon services (e.g., inference, visualization, compute, AI, etc.) of deployment system 906 during execution of applications.

In at least one embodiment, some applications used in advanced processing and inferencing pipelines may use machine learning models or other AI to perform one or more processing steps. In at least one embodiment, machine learning models may be trained at facility 902 using feedback data 908 (such as imaging data) stored at facility 902 or feedback data 908 from another facility or facilities, or a combination thereof. In at least one embodiment, training system 904 may be used to provide applications, services, and/or other resources for generating working, deployable machine learning models for deployment system 906.

In at least one embodiment, a model registry 924 may be backed by object storage that may support versioning and object metadata. In at least one embodiment, object storage may be accessible through, for example, a cloud storage (e.g., a cloud 1026 of FIG. 10) compatible application programming interface (API) from within a cloud platform. In at least one embodiment, machine learning models within model registry 924 may be uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, a training pipeline 1004 (FIG. 10) may include a scenario where facility 902 is training their own machine learning model, or has an existing machine learning model that needs to be optimized or updated. In at least one embodiment, feedback data 908 may be received from various channels, such as forums, web forms, or the like. In at least one embodiment, once feedback data 908 is received, AI-assisted annotation 910 may be used to aid in generating annotations corresponding to feedback data 908 to be used as ground truth data for a machine learning model. In at least one embodiment, AI-assisted annotation 910 may include one or more machine learning models (e.g., convolutional neural networks (CNNs)) that may be trained to generate annotations corresponding to certain types of feedback data 908 (e.g., from certain devices) and/or certain types of anomalies in feedback data 908. In at least one embodiment, AI-assisted annotations 910 may then be used directly, or may be adjusted or fine-tuned using an annotation tool, to generate ground truth data. In at least one embodiment, in some examples, labeled data 912 may be used as ground truth data for training a machine learning model. In at least one embodiment, AI-assisted annotations 910, labeled data 912, or a combination thereof may be used as ground truth data for training a machine learning model, e.g., via model training 914 in FIGS. 9-10. In at least one embodiment, a trained machine learning model may be referred to as an output model 916, and may be used by deployment system 906, as described herein.

In at least one embodiment, training pipeline 1004 (FIG. 10) may include a scenario where facility 902 needs a machine learning model for use in performing one or more processing tasks for one or more applications in deployment system 906, but facility 902 may not currently have such a machine learning model (or may not have a model that is optimized, efficient, or effective for such purposes). In at least one embodiment, an existing machine learning model may be selected from model registry 924. In at least one embodiment, model registry 924 may include machine learning models trained to perform a variety of different inference tasks on imaging data. In at least one embodiment, machine learning models in model registry 924 may have been trained on imaging data from different facilities than facility 902 (e.g., facilities that are remotely located). In at least one embodiment, machine learning models may have been trained on imaging data from one location, two locations, or any number of locations. In at least one embodiment, when being trained on imaging data, which may be a form of feedback data 908, from a specific location, training may take place at that location, or at least in a manner that protects confidentiality of imaging data or restricts imaging data from being transferred off-premises (e.g., to comply with HIPAA regulations, privacy regulations, etc.). In at least one embodiment, once a model is trained—or partially trained—at one location, a machine learning model may be added to model registry 924. In at least one embodiment, a machine learning model may then be retrained, or updated, at any number of other facilities, and a retrained or updated model may be made available in model registry 924. In at least one embodiment, a machine learning model may then be selected from model registry 924—and referred to as output model 916—and may be used in deployment system 906 to perform one or more processing tasks for one or more applications of a deployment system.

In at least one embodiment, training pipeline 1004 (FIG. 10) may be used in a scenario that includes facility 902 requiring a machine learning model for use in performing one or more processing tasks for one or more applications in deployment system 906, but facility 902 may not currently have such a machine learning model (or may not have a model that is optimized, efficient, or effective for such purposes). In at least one embodiment, a machine learning model selected from model registry 924 might not be fine-tuned or optimized for feedback data 908 generated at facility 902 because of differences in populations, genetic variations, robustness of training data used to train a machine learning model, diversity in anomalies of training data, and/or other issues with training data. In at least one embodiment, AI-assisted annotation 910 may be used to aid in generating annotations corresponding to feedback data 908 to be used as ground truth data for retraining or updating a machine learning model. In at least one embodiment, labeled data 912 may be used as ground truth data for training a machine learning model. In at least one embodiment, retraining or updating a machine learning model may be referred to as model training 914. In at least one embodiment, model training 914—e.g., AI-assisted annotations 910, labeled data 912, or a combination thereof—may be used as ground truth data for retraining or updating a machine learning model.

In at least one embodiment, deployment system 906 may include software 918, services 920, hardware 922, and/or other components, features, and functionality. In at least one embodiment, deployment system 906 may include a software "stack," such that software 918 may be built on top of services 920 and may use services 920 to perform some or all of processing tasks, and services 920 and software 918 may be built on top of hardware 922 and use hardware 922 to execute processing, storage, and/or other compute tasks of deployment system 906.

In at least one embodiment, software 918 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of computing device there may be any number of containers that may perform a data processing task with respect to feedback data 908 (or other data types, such as those described herein). In at least one embodiment, an advanced processing and inferencing pipeline may be defined based on selections of different containers that are desired or required for processing feedback data 908, in addition to containers that receive and configure imaging data for use by each container and/or for use by facility 902 after processing through a pipeline (e.g., to convert outputs back to a usable data type for storage and display at facility 902). In at least one embodiment, a combination of containers within software 918 (e.g., that make up a pipeline) may be referred to as a virtual instrument (as described in more detail herein), and a virtual instrument may leverage services 920 and hardware 922 to execute some or all processing tasks of applications instantiated in containers.

In at least one embodiment, data may undergo preprocessing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 916 of training system 904.

In at least one embodiment, tasks of data processing pipeline may be encapsulated in one or more container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 924 and associated with one or more applications. In at least one embodiment, images of applications (e.g., container images) may be available in a container registry, and once selected by a user from a container registry for deployment in a pipeline, an image may be used to generate a container for an instantiation of an application for use by a user system.

In at least one embodiment, developers may develop, publish, and store applications (e.g., as containers) for performing processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 920 as a system (e.g., system 1000 of FIG. 10). In at least one embodiment, once validated by system 1000 (e.g., for accuracy, etc.), an application may be available in a container registry for selection and/or embodiment by a user (e.g., a hospital, clinic, lab, healthcare provider, etc.) to perform one or more processing tasks with respect to data at a facility (e.g., a second facility) of a user.

Figure 10:
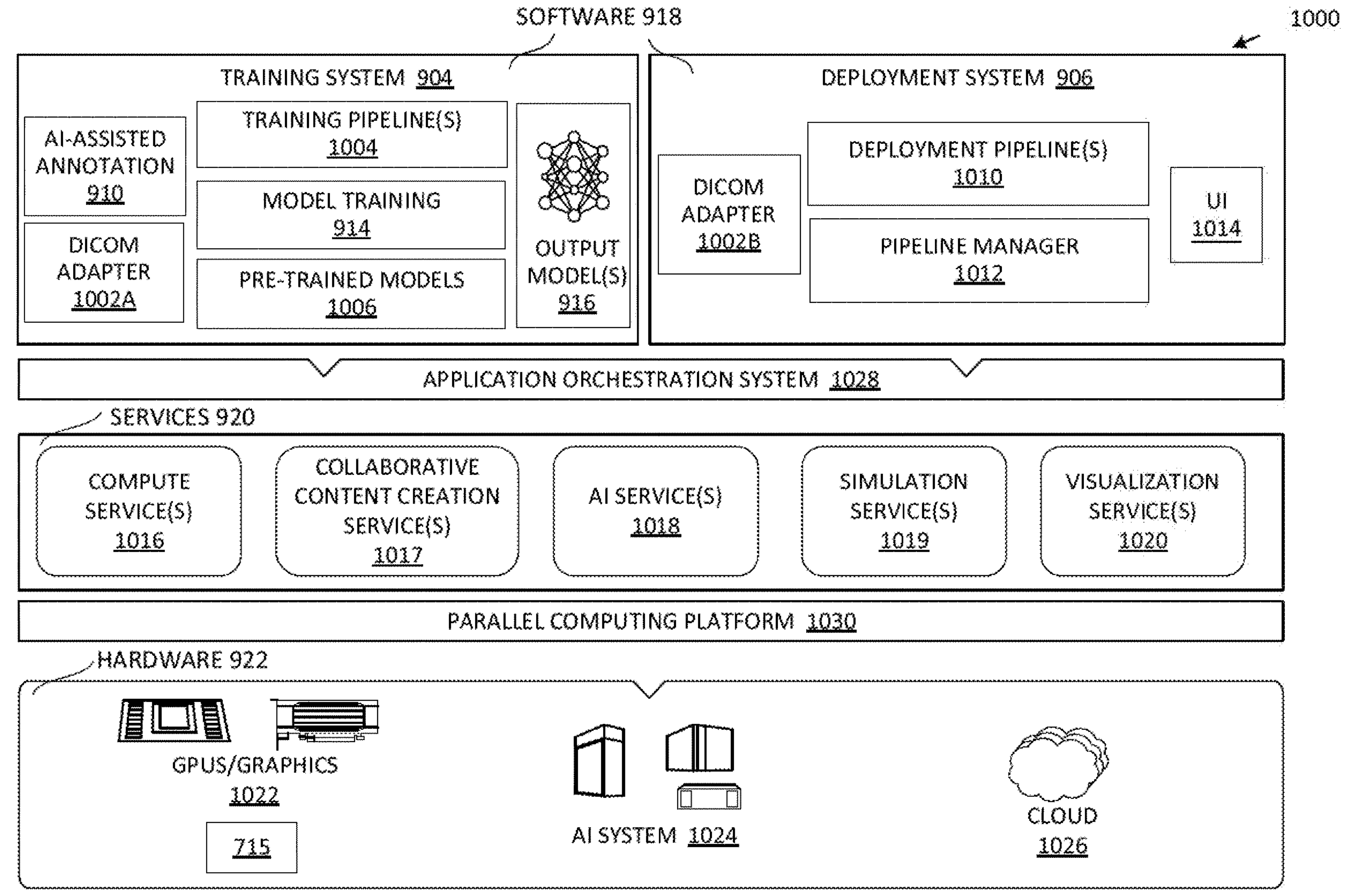
FIG. 10 is a system diagram for an example system for training, adapting, instantiating and deploying machine learning models in an advanced computing pipeline, according to at least one embodiment.

In at least one embodiment, developers may then share applications or containers through a network for access and use by users of a system (e.g., system 1000 of FIG. 10). In at least one embodiment, completed and validated applications or containers may be stored in a container registry and associated machine learning models may be stored in model registry 924. In at least one embodiment, a requesting entity that provides an inference or image processing request may browse a container registry and/or model registry 924 for an application, container, dataset, machine learning model, etc., select a desired combination of elements for inclusion in data processing pipeline, and submit a processing request. In at least one embodiment, a request may include input data that is necessary to perform a request, and/or may include a selection of application(s) and/or machine learning models to be executed in processing a request. In at least one embodiment, a request may then be passed to one or more components of deployment system 906 (e.g., a cloud) to perform processing of a data processing pipeline. In at least one embodiment, processing by deployment system 906 may include referencing selected elements (e.g., applications, containers, models, etc.) from a container registry and/or model registry 924. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 920 may be leveraged. In at least one embodiment, services 920 may include compute services, collaborative content creation services, simulation services, artificial intelligence (AI) services, visualization services, and/or other service types. In at least one embodiment, services 920 may provide functionality that is common to one or more applications in software 918, so functionality may be abstracted to a service that may be called upon or leveraged by applications. In at least one embodiment, functionality provided by services 920 may run dynamically and more efficiently, while also scaling well by allowing applications to process data in parallel, e.g., using a parallel computing platform 1030 (FIG. 10). In at least one embodiment, rather than each application that shares a same functionality offered by a service 920 being required to have a respective instance of service 920, service 920 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities.

In at least one embodiment, where a service 920 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 918 implementing advanced processing and inferencing pipeline may be streamlined because each application may call upon the same inference service to perform one or more inferencing tasks.

In at least one embodiment, hardware 922 may include GPUs, CPUs, graphics cards, an AI/deep learning system (e.g., an AI supercomputer, such as NVIDIA's DGX™ supercomputer system), a cloud platform, or a combination thereof. In at least one embodiment, different types of hardware 922 may be used to provide efficient, purpose-built support for software 918 and services 920 in deployment system 906. In at least one embodiment, use of GPU processing may be implemented for processing locally (e.g., at facility 902), within an AI/deep learning system, in a cloud system, and/or in other processing components of deployment system 906 to improve efficiency, accuracy, and efficacy of game name recognition.

In at least one embodiment, software 918 and/or services 920 may be optimized for GPU processing with respect to deep learning, machine learning, and/or high-performance computing, simulation, and visual computing, as non-limiting examples. In at least one embodiment, at least some of the computing environment of deployment system 906 and/or training system 904 may be executed in a datacenter or one or more supercomputers or high performance computing systems, with GPU-optimized software (e.g., hardware and software combination of NVIDIA's DGX™ system). In at least one embodiment, hardware 922 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC') may be executed using an AI/deep learning supercomputer(s) and/or GPU-optimized software (e.g., as provided on NVIDIA's DGX™ systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 10 is a system diagram for an example system 1000 for generating and deploying a deployment pipeline, according to at least one embodiment. In at least one embodiment, system 1000 may be used to implement process 900 of FIG. 9 and/or other processes including advanced processing and inferencing pipelines. In at least one embodiment, system 1000 may include training system 904 and deployment system 906. In at least one embodiment, training system 904 and deployment system 906 may be implemented using software 918, services 920, and/or hardware 922, as described herein.

In at least one embodiment, system 1000 (e.g., training system 904 and/or deployment system 906) may implemented in a cloud computing environment (e.g., using cloud 1026). In at least one embodiment, system 1000 may be implemented locally with respect to a facility, or as a combination of both cloud and local computing resources. In at least one embodiment, access to APIs in cloud 1026 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1000, may be restricted to a set of public internet service providers (ISPs) that have been vetted or authorized for interaction.

In at least one embodiment, various components of system 1000 may communicate between and among one another using any of a variety of different network types, including but not limited to local area networks (LANs) and/or wide area networks (WANs) via wired and/or wireless communication protocols. In at least one embodiment, communication between facilities and components of system 1000 (e.g., for transmitting inference requests, for receiving results of inference requests, etc.) may be communicated over a data bus or data busses, wireless data protocols (Wi-Fi), wired data protocols (e.g., Ethernet), etc.

In at least one embodiment, training system 904 may execute training pipelines 1004, similar to those described herein with respect to FIG. 9. In at least one embodiment, where one or more machine learning models are to be used in deployment pipelines 1010 by deployment system 906, training pipelines 1004 may be used to train or retrain one or more (e.g., pre-trained) models, and/or implement one or more of pre-trained models 1006 (e.g., without a need for retraining or updating). In at least one embodiment, as a result of training pipelines 1004, output model(s) 916 may be generated. In at least one embodiment, training pipelines 1004 may include any number of processing steps, AI-assisted annotation 910, labeling or annotating of feedback data 908 to generate labeled data 912, model selection from a model registry, model training 914, training, retraining, or updating models, and/or other processing steps. In at least one embodiment, for different machine learning models used by deployment system 906, different training pipelines 1004 may be used. In at least one embodiment, training pipeline 1004, similar to a first example described with respect to FIG. 9, may be used for a first machine learning model, training pipeline 1004, similar to a second example described with respect to FIG. 9, may be used for a second machine learning model, and training pipeline 1004, similar to a third example described with respect to FIG. 9, may be used for a third machine learning model. In at least one embodiment, any combination of tasks within training system 904 may be used depending on what is required for each respective machine learning model. In at least one embodiment, one or more of machine learning models may already be trained and ready for deployment so machine learning models may not undergo any processing by training system 904, and may be implemented by deployment system 906.

In at least one embodiment, output model(s) 916 and/or pre-trained model(s) 1006 may include any types of machine learning models depending on embodiment. In at least one embodiment, and without limitation, machine learning models used by system 1000 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Bi-LSTM, Hopfield, Boltzmann, deep belief, deconvolutional, generative adversarial, liquid state machine, etc.), and/or other types of machine learning models.

In at least one embodiment, training pipelines 1004 may include AI-assisted annotation. In at least one embodiment, labeled data 912 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of feedback data 908 (or other data type used by machine learning models), there may be corresponding ground truth data generated by training system 904. In at least one embodiment, AI-assisted annotation may be performed as part of deployment pipelines 1010; either in addition to, or in lieu of, AI-assisted annotation included in training pipelines 1004. In at least one embodiment, system 1000 may include a multi-layer platform that may include a software layer (e.g., software 918) of diagnostic applications (or other application types) that may perform one or more medical imaging and diagnostic functions.

In at least one embodiment, a software layer may be implemented as a secure, encrypted, and/or authenticated API through which applications or containers may be invoked (e.g., called) from an external environment(s), e.g., facility 902. In at least one embodiment, applications may then call or execute one or more services 920 for performing compute, AI, or visualization tasks associated with respective applications, and software 918 and/or services 920 may leverage hardware 922 to perform processing tasks in an effective and efficient manner.

In at least one embodiment, deployment system 906 may execute deployment pipelines 1010. In at least one embodiment, deployment pipelines 1010 may include any number of applications that may be sequentially, non-sequentially, or otherwise applied to feedback data (and/or other data types), including AI-assisted annotation, as described above. In at least one embodiment, as described herein, a deployment pipeline 1010 for an individual device may be referred to as a virtual instrument for a device. In at least one embodiment, for a single device, there may be more than one deployment pipeline 1010 depending on information desired from data generated by a device.

In at least one embodiment, applications available for deployment pipelines 1010 may include any application that may be used for performing processing tasks on feedback data or other data from devices. In at least one embodiment, because various applications may share common image operations, in some embodiments, a data augmentation library (e.g., as one of services 920) may be used to accelerate these operations. In at least one embodiment, to avoid bottlenecks of conventional processing approaches that rely on CPU processing, parallel computing platform 1030 may be used for GPU acceleration of these processing tasks.

In at least one embodiment, deployment system 906 may include a user interface (UI) 1014 (e.g., a graphical user interface, a web interface, etc.) that may be used to select applications for inclusion in deployment pipeline(s) 1010, arrange applications, modify or change applications or parameters or constructs thereof, use and intera with deployment pipeline(s) 1010 during set-up and/or deployment, and/or to otherwise interact with deployment system 906. In at least one embodiment, although not illustrated with respect to training system 904, UI 1014 (or a different user interface) may be used for selecting models for use in deployment system 906, for selecting models for training, or retraining, in training system 904, and/or for otherwise interacting with training system 904.

In at least one embodiment, pipeline manager 1012 may be used, in addition to an application orchestration system 1028, to manage interaction between applications or containers of deployment pipeline(s) 1010 and services 920 and/or hardware 922. In at least one embodiment, pipeline manager 1012 may be configured to facilitate interactions from application to application, from application to service 920, and/or from application or service to hardware 922. In at least one embodiment, although illustrated as included in software 918, this is not intended to be limiting, and in some examples pipeline manager 1012 may be included in services 920. In at least one embodiment, application orchestration system 1028 (e.g., Kubernetes, DOCKER, etc.) may include a container orchestration system that may group applications into containers as logical units for coordination, management, scaling, and deployment. In at least one embodiment, by associating applications from deployment pipeline(s) 1010 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of other application(s) or container(s). In at least one embodiment, communication, and cooperation between different containers or applications may be aided by pipeline manager 1012 and application orchestration system 1028. In at least one embodiment, so long as an expected input and/or output of each container or application is known by a system (e.g., based on constructs of applications or containers), application orchestration system 1028 and/or pipeline manager 1012 may facilitate communication among and between, and sharing of resources among and between, each of applications or containers. In at least one embodiment, because one or more of applications or containers in deployment pipeline(s) 1010 may share the same services and resources, application orchestration system 1028 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, the scheduler may thus allocate resources to different applications and distribute resources between and among applications in view of requirements and availability of a system. In some examples, the scheduler (and/or other component of application orchestration system 1028) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 920 leveraged and shared by applications or containers in deployment system 906 may include compute services 1016, collaborative content creation services 1017, AI services 1018, simulation services 1019, visualization services 1020, and/or other service types. In at least one embodiment, applications may call (e.g., execute) one or more of services 920 to perform processing operations for an application. In at least one embodiment, compute services 1016 may be leveraged by applications to perform super-computing or other high-performance computing (HPC) tasks. In at least one embodiment, compute service(s) 1016 may be leveraged to perform parallel processing (e.g., using a parallel computing platform 1030) for processing data through one or more of applications and/or one or more tasks of a single application, substantially simultaneously. In at least one embodiment, parallel computing platform 1030 (e.g., NVIDIA's CUDA) may enable general purpose computing on GPUs (GPGPU) (e.g., GPUs 1022). In at least one embodiment, a software layer of parallel computing platform 1030 may provide access to virtual instruction sets and parallel computational elements of GPUs, for execution of compute kernels. In at least one embodiment, parallel computing platform 1030 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1030 (e.g., where multiple different stages of an application or multiple applications are processing same information). In at least one embodiment, rather than making a copy of data and moving data to different locations in memory (e.g., a read/write operation), same data in the same location of a memory may be used for any number of processing tasks (e.g., at the same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1018 may be leveraged to perform inferencing services for executing machine learning model(s) associated with applications (e.g., tasked with performing one or more processing tasks of an application). In at least one embodiment, AI services 1018 may leverage AI system 1024 to execute machine learning model(s) (e.g., neural networks, such as CNNs) for segmentation, reconstruction, object detection, feature detection, classification, and/or other inferencing tasks. In at least one embodiment, applications of deployment pipeline(s) 1010 may use one or more of output models 916 from training system 904 and/or other models of applications to perform inference on imaging data (e.g., DICOM data, RIS data, CIS data, REST compliant data, RPC data, raw data, etc.). In at least one embodiment, two or more examples of inferencing using application orchestration system 1028 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1028 may distribute resources (e.g., services 920 and/or hardware 922) based on priority paths for different inferencing tasks of AI services 1018.

In at least one embodiment, shared storage may be mounted to AI services 1018 within system 1000. In at least one embodiment, shared storage may operate as a cache (or other storage device type) and may be used to process inference requests from applications. In at least one embodiment, when an inference request is submitted, a request may be received by a set of API instances of deployment system 906, and one or more instances may be selected (e.g., for best fit, for load balancing, etc.) to process a request. In at least one embodiment, to process a request, a request may be entered into a database, a machine learning model may be located from model registry 924 if not already in a cache, a validation step may ensure appropriate machine learning model is loaded into a cache (e.g., shared storage), and/or a copy of a model may be saved to a cache. In at least one embodiment, the scheduler (e.g., of pipeline manager 1012) may be used to launch an application that is referenced in a request if an application is not already running or if there are not enough instances of an application. In at least one embodiment, if an inference server is not already launched to execute a model, an inference server may be launched. In at least one embodiment, any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as the inference server is running as a different instance.

In at least one embodiment, during application execution, an inference request for a given application may be received, and a container (e.g., hosting an instance of an inference server) may be loaded (if not already loaded), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (turnaround time less than one minute) priority while others may have lower priority (e.g., turnaround less than 10 minutes). In at least one embodiment, model execution times may be measured from requesting institution or entity and may include partner network traversal time, as well as execution on an inference service.

In at least one embodiment, transfer of requests between services 920 and inference applications may be hidden behind a software development kit (SDK), and robust transport may be provided through a queue. In at least one embodiment, a request is placed in a queue via an API for an individual application/tenant ID combination and an SDK pulls a request from a queue and gives a request to an application. In at least one embodiment, a name of a queue may be provided in an environment from where an SDK picks up the request. In at least one embodiment, asynchronous communication through a queue may be useful as it may allow any instance of an application to pick up work as it becomes available. In at least one embodiment, results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1026, and an inference service may perform inferencing on a GPU.

In at least one embodiment, visualization services 1020 may be leveraged to generate visualizations for viewing outputs of applications and/or deployment pipeline(s) 1010. In at least one embodiment, GPUs 1022 may be leveraged by visualization services 1020 to generate visualizations. In at least one embodiment, rendering effects, such as ray-tracing or other light transport simulation techniques, may be implemented by visualization services 1020 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1020 may include an internal visualizer, cinematics, and/or other rendering or image processing capabilities or functionality (e.g., ray tracing, rasterization, internal optics, etc.).

In at least one embodiment, hardware 922 may include GPUs 1022, AI system 1024, cloud 1026, and/or any other hardware used for executing training system 904 and/or deployment system 906. In at least one embodiment, GPUs 1022 (e.g., NVIDIA's TESLA ° and/or QUADRO ° GPUs) may include any number of GPUs that may be used for executing processing tasks of compute services 1016, collaborative content creation services 1017, AI services 1018, simulation services 1019, visualization services 1020, other services, and/or any of features or functionality of software 918. For example, with respect to AI services 1018, GPUs 1022 may be used to perform pre-processing on imaging data (or other data types used by machine learning models), post-processing on outputs of machine learning models, and/or to perform inferencing (e.g., to execute machine learning models). In at least one embodiment, cloud 1026, AI system 1024, and/or other components of system 1000 may use GPUs 1022. In at least one embodiment, cloud 1026 may include a GPU-optimized platform for deep learning tasks. In at least one embodiment, AI system 1024 may use GPUs, and cloud 1026—or at least a portion tasked with deep learning or inferencing—may be executed using one or more AI systems 1024. As such, although hardware 922 is illustrated as discrete components, this is not intended to be limiting, and any components of hardware 922 may be combined with, or leveraged by, any other components of hardware 922.

In at least one embodiment, AI system 1024 may include a purpose-built computing system (e.g., a super-computer or an HPC) configured for inferencing, deep learning, machine learning, and/or other artificial intelligence tasks. In at least one embodiment, AI system 1024 (e.g., NVIDIA's DGX™) may include GPU-optimized software (e.g., a software stack) that may be executed using a plurality of GPUs 1022, in addition to CPUs, RAM, storage, and/or other components, features, or functionality. In at least one embodiment, one or more AI systems 1024 may be implemented in cloud 1026 (e.g., in a data center) for performing some or all of AI-based processing tasks of system 1000.

In at least one embodiment, cloud 1026 may include a GPU-accelerated infrastructure (e.g., NVIDIA's NGC™) that may provide a GPU-optimized platform for executing processing tasks of system 1000. In at least one embodiment, cloud 1026 may include an AI system(s) 1024 for performing one or more of AI-based tasks of system 1000 (e.g., as a hardware abstraction and scaling platform). In at least one embodiment, cloud 1026 may integrate with application orchestration system 1028 leveraging multiple GPUs to enable seamless scaling and load balancing between and among applications and services 920. In at least one embodiment, cloud 1026 may be tasked with executing at least some of services 920 of system 1000, including compute services 1016, AI services 1018, and/or visualization services 1020, as described herein. In at least one embodiment, cloud 1026 may perform small and large batch inference (e.g., executing NVIDIA's TensorRT™), provide an accelerated parallel computing API and platform 1030 (e.g., NVIDIA's CUDA®), execute application orchestration system 1028 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1000.

In at least one embodiment, in an effort to preserve patient confidentiality (e.g., where patient data or records are to be used off-premises), cloud 1026 may include a registry, such as a deep learning container registry. In at least one embodiment, a registry may store containers for instantiations of applications that may perform pre-processing, post-processing, or other processing tasks on patient data. In at least one embodiment, cloud 1026 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, a number of items in a plurality is at least two, but may be more when so indicated either explicitly or by context. Further, unless stated otherwise or otherwise clear from context, the phrase "based on" means "based at least in part on" and not "based solely on."

Operations of processes described herein may be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transforms that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as a system may embody one or more methods and methods may be considered a system.

In the present document, references may be made to obtaining, acquiring, receiving, or inputting analog or digital data into a subsystem, computer system, or computer-implemented machine. In at least one embodiment, a process of obtaining, acquiring, receiving, or inputting analog and digital data may be accomplished in a variety of ways such as by receiving data as a parameter of a function call or a call to an application programming interface. In at least one embodiment, processes of obtaining, acquiring, receiving, or inputting analog or digital data may be accomplished by transferring data via a serial or parallel interface. In at least one embodiment, processes of obtaining, acquiring, receiving, or inputting analog or digital data may be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data may be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:

generating a plurality of compressed representations of an input image;

processing, in parallel, the plurality of compressed representations of the input image using a plurality of machine learning models (MLMs), wherein a respective MLM of the plurality of MLMs is used to process a respective compressed representation of the plurality of compressed representations of the input image to estimate a location of a region of interest (ROI) in the respective compressed representation of the input image, and wherein a number of neurons in an input layer of the respective MLM corresponds to a number of pixels of the respective compressed representation; and responsive to at least a predetermined number of the estimated locations of the ROI satisfying a matching condition, generating an image of the ROI based on the input image and one or more of the estimated locations.

2. The method of claim 1, wherein generating the plurality of compressed representations of the input image comprises:

obtaining each of a plurality of pixels of a first compressed representation of the plurality of compressed representations of the input image by aggregating two or more pixels of the input image; and obtaining each of a plurality of pixels of a second compressed representation of the plurality of compressed representations of the input image by aggregating two or more pixels of the first compressed representation.

3. The method of claim 1, the matching condition comprises:

the predetermined number of the estimated locations of the ROI being within a predetermined tolerance from each other.

4. The method of claim 1, wherein each of the estimated locations of the ROI comprises an identification of a size and position of a bounding box enclosing the ROI.

5. The method of claim 1, further comprising:

processing, using a classification MLM, the generated image of the ROI to obtain at least one of:

an identification of an object depicted in the generated image of the ROI, or a medical diagnosis associated with an organ depicted in the generated image of the ROI.

6. The method of claim 1, wherein at least one of the predetermined number of the estimated locations of the ROI or a number of compressed representations is determined based on available, for processing of the input image, computing resources and a size of the input image.

7. The method of claim 1, wherein at least one of the predetermined number of the estimated locations of the ROI or a number of compressed representations is determined based on parameters of the MLM.

8. The method of claim 6, wherein the computing resources available for processing of the input image comprise one or more graphics processing units (GPUs).

9. The method of claim 6, wherein at least one of the predetermined number of the estimated locations of the ROI or a number of compressed representations is determined using a mapping table comprising empirical correspondence of the available computing resources and the size of the input image to the at least one of the predetermined number of the estimated locations of the ROI or the number of compressed representations.

10. The method of claim 6, wherein at least one of the predetermined number of the estimated locations of the ROI or a number of compressed representations is determined by applying a learned model to a list of the available computing resources and the size of the input image.

11. A system comprising:

one or more processing devices to:

generate a plurality of compressed representations of an input image;

process, in parallel, the plurality of compressed representations of the input image using a plurality of machine learning models (MLMs), wherein a respective MLM of the plurality of MLMs is used to process a respective compressed representation of the plurality of compressed representations of the input image to estimate a location of a region of interest (ROI) in the respective compressed representation of the input image, and wherein a number of neurons in an input layer of the respective MLM corresponds to a number of pixels of the respective compressed representation; and responsive to at least a predetermined number of the estimated locations of the ROI satisfying a matching condition, generate an image of the ROI based on the input image and one or more of the estimated locations.

12. The system of claim 11, wherein to generate the plurality of compressed representations of the input image, the one or more processing devices are to:

obtain each of a plurality of pixels of a first compressed representation of the plurality of compressed representations of the input image by aggregating two or more pixels of the input image; and obtain each of a plurality of pixels of a second compressed representation of the plurality of compressed representations of the input image by aggregating two or more pixels of the first compressed representation.

13. The system of claim 11, wherein the matching condition comprises:

the predetermined number of the estimated locations of the ROI being within a predetermined tolerance of each other.

14. The system of claim 11, wherein the one or more processing devices are further to:

process, using a classification MLM, the generated image of the ROI to obtain at least one of:

an identification of an object depicted in the generated image of the ROI, or a medical diagnosis associated with an organ depicted in the generated image of the ROI.

15. The system of claim 11, wherein at least one of the predetermined number of the estimated locations of the ROI or a number of compressed representations is determined based on available, for processing of the input image, computing resources and a size of the input image.

16. The system of claim 11, wherein at least one of the predetermined number of the estimated locations of the ROI or a number of compressed representations is determined based on parameters of the MLM.

17. The system of claim 15, wherein the computing resources available for processing of the input image comprise one or more graphics processing units (GPUs).

18. The system of claim 15, wherein at least one of the predetermined number of the estimated locations of the ROI or a number of compressed representations is determined using a mapping table comprising empirical correspondence of the available computing resources and the size of the input image to the at least one of the predetermined number of the estimated locations of the ROI or the number of compressed representations.

19. The system of claim 15, wherein at least one of the predetermined number of the estimated locations of the ROI or a number of compressed representations is determined by applying a learned model to a list of the available computing resources and the size of the input image.

20. A processor comprising:

one or more processing units to:

generate a plurality of compressed representations of an input image;

process, in parallel, the plurality of compressed representations of the input image using a plurality of machine learning models (MLMs), wherein a respective MLM of the plurality of MLMs is used to process a respective compressed representation of the plurality of compressed representations of the input image to estimate a location of a region of interest (ROI) in the respective compressed representation of the input image, and wherein a number of neurons in an input layer of the respective MLM corresponds to a number of pixels of the respective compressed representation; and responsive to at least a predetermined number of the estimated locations of the ROI satisfying a matching condition, generate an image of the ROI based on the input image and one or more of the estimated locations.

* * * * *